United States Patent
Yamamoto et al.

(10) Patent No.: US 12,489,814 B2
(45) Date of Patent: Dec. 2, 2025

(54) MANAGEMENT DEVICE, VEHICLE COMMUNICATION SYSTEM, VEHICLE, VEHICLE COMMUNICATION MANAGEMENT METHOD, AND VEHICLE COMMUNICATION MANAGEMENT PROGRAM

(71) Applicants: SUMITOMO ELECTRIC INDUSTRIES, LTD., Osaka (JP); SUMITOMO WIRING SYSTEMS, LTD., Yokkaichi (JP); AUTONETWORKS TECHNOLOGIES, LTD., Yokkaichi (JP)

(72) Inventors: Yusuke Yamamoto, Osaka (JP); Koichi Takayama, Osaka (JP); Hideyuki Tanaka, Osaka (JP); Tatsuya Izumi, Osaka (JP); Junji Yano, Osaka (JP); Yasuhiro Yabuuchi, Yokkaichi (JP); Tadashi Matsumoto, Yokkaichi (JP); Takeshi Hagihara, Yokkaichi (JP)

(73) Assignees: SUMITOMO ELECTRIC INDUSTRIES, LTD., Osaka (JP); SUMITOMO WIRING SYSTEMS, LTD., Mie (JP); AUTONETWORKS TECHNOLOGIES, LTD., Mie (JP)

( * ) Notice: Subject to any disclaimer, the term of this patent is extended or adjusted under 35 U.S.C. 154(b) by 0 days.

(21) Appl. No.: 18/596,981

(22) Filed: Mar. 6, 2024

(65) Prior Publication Data

US 2024/0223660 A1 Jul. 4, 2024

Related U.S. Application Data

(63) Continuation of application No. 17/437,027, filed as application No. PCT/JP2019/041016 on Oct. 18, 2019, now Pat. No. 11,956,314.

(30) Foreign Application Priority Data

Mar. 5, 2019 (JP) ................................. 2019-039548

(51) Int. Cl.
*H04L 67/12* (2022.01)
*H04L 41/0813* (2022.01)
*H04L 41/12* (2022.01)

(52) U.S. Cl.
CPC .............. *H04L 67/12* (2013.01); *H04L 41/12* (2013.01); *H04L 41/0813* (2013.01)

(58) Field of Classification Search
CPC ..... H04L 67/12; H04L 41/0806; H04L 41/12; H04L 41/0813; H04L 49/354;
(Continued)

(56) References Cited

U.S. PATENT DOCUMENTS 8,520,512 B2 * 8/2013 Gilde .................. H04L 12/4641
726/22
8,751,649 B2 6/2014 Villait et al.
(Continued)

FOREIGN PATENT DOCUMENTS

JP 2003-218928 A 7/2003
JP 2011-014033 A 1/2011
(Continued)

OTHER PUBLICATIONS

Apr. 30, 2024 Notice of Allowance issued in U.S. Appl. No. 17/436,702.
(Continued)

*Primary Examiner* — Tonia L Dollinger
*Assistant Examiner* — Linh T. Nguyen
(74) *Attorney, Agent, or Firm* — Oliff PLC

(57) ABSTRACT

A network of a new configuration is flexibly constructed while maintaining a stable operation in the network. A
(Continued)

management device includes: a detection unit that detects addition of a function unit to a network including one or a plurality of on-vehicle function units; an acquisition unit that acquires function unit information of a new function unit that is the function unit the addition of which has been detected by the detection unit and function unit information of each on-vehicle function unit, each piece of function unit information including information regarding network configuration of a layer lower than an application layer; and a generation unit that, based on the pieces of function unit information acquired by the acquisition unit, generates configuration information of a new network that is the network further including the new function unit.

19 Claims, 18 Drawing Sheets

(58) Field of Classification Search
CPC ............. H04L 63/0823; H04L 41/0866; H04L 41/085; H04L 41/0869; B60R 16/023
See application file for complete search history.

(56) References Cited

U.S. PATENT DOCUMENTS

| | | | |
|---|---|---|---|
| 8,997,091 B1 * | 3/2015 | Watson | H04L 43/50 |
| | | | 717/170 |
| 9,432,260 B2 | 8/2016 | Wang et al. | |
| 11,397,801 B2 * | 7/2022 | Ben-Noon | H04L 63/1425 |
| 11,956,314 B2 * | 4/2024 | Yamamoto | H04L 67/12 |
| 2005/0004726 A1 | 1/2005 | Paquet | |
| 2005/0216903 A1 * | 9/2005 | Schaefer | G07C 5/008 |
| | | | 717/168 |
| 2010/0302974 A1 * | 12/2010 | Niiyama | G07C 5/0808 |
| | | | 370/254 |
| 2011/0044291 A1 * | 2/2011 | Omar | H04W 60/04 |
| | | | 370/332 |
| 2013/0090820 A1 | 4/2013 | Frashure et al. | |
| 2013/0091534 A1 | 4/2013 | Gilde et al. | |
| 2013/0230124 A1 | 9/2013 | Chini et al. | |
| 2013/0294453 A1 | 11/2013 | Han et al. | |
| 2014/0280809 A1 * | 9/2014 | Li | H04L 41/0886 |
| | | | 709/222 |
| 2014/0337829 A1 | 11/2014 | Ito | |
| 2015/0280992 A1 * | 10/2015 | Wang | H04L 69/324 |
| | | | 370/254 |
| 2016/0065298 A1 | 3/2016 | Nakagawa et al. | |
| 2016/0301577 A1 * | 10/2016 | Lane | H04L 41/18 |
| 2017/0033986 A1 * | 2/2017 | Anderson | H04L 12/4625 |
| 2017/0048158 A1 | 2/2017 | Park et al. | |
| 2017/0093866 A1 | 3/2017 | Ben-Noon et al. | |
| 2018/0351791 A1 | 12/2018 | Nagarajan et al. | |
| 2019/0342989 A1 * | 11/2019 | Toyama | H05K 1/02 |
| 2020/0274876 A1 | 8/2020 | Mathew et al. | |
| 2020/0382446 A1 * | 12/2020 | Jung | H04L 12/40 |
| 2021/0261096 A1 * | 8/2021 | Kabany | H04W 4/38 |
| 2021/0397433 A1 * | 12/2021 | Itatsu | H04L 67/34 |
| 2021/0400452 A1 * | 12/2021 | Baba | H04L 45/645 |
| 2023/0142079 A1 * | 5/2023 | Iwata | B60R 16/023 |
| | | | 709/238 |

FOREIGN PATENT DOCUMENTS

| | | |
|---|---|---|
| JP | 2017-220220 A | 12/2017 |
| JP | 2018-192876 A | 12/2018 |

OTHER PUBLICATIONS

U.S. Appl. No. 18/772,798.
English Translation of PCT/JP2019/041025 International Patent Application filed on Oct. 18, 2019.
U.S. Appl. No. 17/436,702, filed Sep. 7, 2021 in the name of Yusuke Yamamoto et al.
Jan. 4, 2024 U.S. Office Action issued in U.S. Appl. No. 17/436,702.

* cited by examiner

FIG. 8

| HARDWARE DEVICE | PORT NUMBER | VLAN ID |
|---|---|---|
| TCU111A | 1 | VLAN10 |
| INTAKE PRESSURE SENSOR 111B | 1 | VLAN20 |
| ENGINE ECU 111C | 1 | VLAN20 |
| TEMPERATURE SENSOR 111D | 1 | VLAN30 |
| WATER TEMPERATURE SENSOR 111E | 1 | VLAN30 |
| RELAY DEVICE 112 | 1 | VLAN10 |
| RELAY DEVICE 112 | 2 | VLAN20 |
| RELAY DEVICE 112 | 3 | VLAN30 |
| IMAGE SENSOR 111G | 1 | VLAN30 |

FIG. 10

| HARDWARE DEVICE | PORT NUMBER | VLAN ID |
|---|---|---|
| TCU111A | 1 | VLAN10 |
| INTAKE PRESSURE SENSOR 111B | 1 | VLAN20 |
| ENGINE ECU 111C | 1 | VLAN20 |
| TEMPERATURE SENSOR 111D | 1 | VLAN30 |
| WATER TEMPERATURE SENSOR 111E | 1 | VLAN30 |
| RELAY DEVICE 112 | 1 | VLAN10 |
| RELAY DEVICE 112 | 2 | VLAN20 |
| RELAY DEVICE 112 | 3 | VLAN20, VLAN30 |
| IMAGE SENSOR 111G | 1 | VLAN20 |

FIG. 12

| HARDWARE DEVICE | PORT NUMBER | VLAN ID |
|---|---|---|
| TCU111A | 1 | VLAN10 |
| INTAKE PRESSURE SENSOR 111B | 1 | VLAN20 |
| ENGINE ECU 111C | 1 | VLAN20 |
| TEMPERATURE SENSOR 111D | 1 | VLAN20 |
| WATER TEMPERATURE SENSOR 111E | 1 | VLAN30 |
| RELAY DEVICE 112 | 1 | VLAN10 |
| RELAY DEVICE 112 | 2 | VLAN20 |
| RELAY DEVICE 112 | 3 | VLAN20, VLAN30 |
| IMAGE SENSOR 111G | 1 | VLAN30 |

MANAGEMENT DEVICE, VEHICLE COMMUNICATION SYSTEM, VEHICLE, VEHICLE COMMUNICATION MANAGEMENT METHOD, AND VEHICLE COMMUNICATION MANAGEMENT PROGRAM

CROSS REFERENCE TO RELATED APPLICATION

This application is a continuation of U.S. application Ser. No. 17/437,027, filed Sep. 7, 2021, the contents of which are incorporated herein by reference in their entirety.

TECHNICAL FIELD

The present invention relates to a management device, a vehicle communication system, a vehicle, a vehicle communication management method, and a vehicle communication management program.

This application claims priority on Japanese Patent Application No. 2019-39548 filed on Mar. 5, 2019, the entire content of which is incorporated herein by reference.

BACKGROUND ART

PATENT LITERATURE 1 (Japanese Laid-Open Patent Publication No. 2018-192876) discloses a driving assistance device as follows. That is, the driving assistance device is connectable to an in-vehicle network including one or more communication buses, and includes: a message acquisition unit that acquires a communication message flowing on the communication bus; a determination unit that determines whether or not an electronic control device for vehicle control is connected to the communication bus, based on the communication message acquired by the message acquisition unit; and a communication control unit that, when the determination unit has determined that the electronic control device is connected to the communication bus, stops transmission of the communication message to the communication bus to which the electronic control device is connected.

Meanwhile, PATENT LITERATURE 2 (Japanese Laid-Open Patent Publication No. 2017-220220) discloses an electronic control device for a vehicle as follows. That is, the electronic control device for a vehicle is an electronic control device (1 to 5) that is connected to an on-vehicle network (6) and executes a predetermined function based on an application installed therein. Each electronic control device includes: a service interface (8) that, in response to a request from the application, requests a service of using a function installed in another electronic control device connected to the on-vehicle network, and that, upon receiving a service request from the other electronic control device, creates the service and responds to the request; a service bus (9) that transmits and receives messages corresponding to a service request and a service response according to a predetermined protocol between the service interface and the service interface of the other electronic control device; and a service management unit (11) that manages the position of the service to allow the service to be dynamically and mutually used.

CITATION LIST

Patent Literature

PATENT LITERATURE 1: Japanese Laid-Open Patent Publication No. 2018-192876

PATENT LITERATURE 2: Japanese Laid-Open Patent Publication No. 2017-220220

SUMMARY OF INVENTION

A management device according to the present disclosure includes: a detection unit configured to detect addition of a function unit to a network including one or a plurality of on-vehicle function units; an acquisition unit configured to acquire function unit information of a new function unit that is the function unit the addition of which has been detected by the detection unit and function unit information of each on-vehicle function unit, each piece of function unit information including information regarding network configuration of a layer lower than an application layer; and a generation unit configured to, based on the pieces of function unit information acquired by the acquisition unit, generate configuration information of a new network that is the network further including the new function unit.

A vehicle communication system according to the present disclosure includes a management device, and one or a plurality of on-vehicle function units constructing a network. The management device detects addition of a function unit to the network, and acquires, from a new function unit that is the function unit the addition of which has been detected, function unit information including information regarding network configuration of a layer lower than an application layer. The one or the plurality of on-vehicle function units each transmit, to the management device, its own function unit information including information regarding network configuration of a layer lower than an application layer. The management device generates configuration information of a new network that is the network further including the new function unit, based on the function unit information acquired from the new function unit and on the function unit information received from the one or the plurality of on-vehicle function units.

A vehicle communication management method according to the present disclosure is a method that is performed by a management device and includes: detecting addition of a function unit to a network including one or a plurality of on-vehicle function units; acquiring function unit information of the new function unit that is the function unit the addition of which has been detected and function unit information of each on-vehicle function unit, each piece of function unit information including information regarding network configuration of a layer lower than an application layer; and generating, based on the pieces of function unit information acquired, configuration information of a new network that is the network further including the new function unit.

A vehicle communication management method according to the present disclosure is a method that is performed in a vehicle communication system including a management device and one or a plurality of on-vehicle function units constructing a network, and the method includes: a step in which the management device detects addition of a function unit to a network including one or a plurality of on-vehicle function units, and acquires, from a new function unit that is the function unit the addition of which has been detected, function unit information including information regarding network configuration of a layer lower than an application layer; a step in which the one or the plurality of on-vehicle function units each transmit, to the management device, its own function unit information including information regarding network configuration of a layer lower than an application layer; and a step in which the management device generates configuration information of a new network that is the network further including the new function unit, based on the function unit information acquired from the new function unit and on the function unit information received from the one or the plurality of on-vehicle function units.

A vehicle communication management program according to the present disclosure is a program used in a management device, and the program causes a computer to function as: a detection unit configured to detect addition of a function unit to a network including one or a plurality of on-vehicle function units; an acquisition unit configured to acquire function unit information of a new function unit that is the function unit the addition of which has been detected by the detection unit and function unit information of each on-vehicle function unit, each piece of function unit information including information regarding network configuration of a layer lower than an application layer; and a generation unit configured to, based on the pieces of function unit information acquired by the acquisition unit, generate configuration information of a new network that is the network further including the new function unit.

One mode of the present disclosure can be realized as a semiconductor integrated circuit that realizes a part or the entirety of the management device. One mode of the present disclosure can be realized as a semiconductor integrated circuit that realizes a part or the entirety of the vehicle communication system. One mode of the present disclosure can be realized as a program for causing a computer to perform steps of processing in the vehicle communication system.

BRIEF DESCRIPTION OF DRAWINGS

FIG. 8 shows an example of configuration information generated by a generation unit according to the embodiment of the present disclosure.

FIG. 10 shows another example of the configuration information generated by the generation unit according to the embodiment of the present disclosure.

FIG. 12 shows another example of the configuration information generated by the generation unit according to the embodiment of the present disclosure.

DESCRIPTION OF EMBODIMENTS

Figure 1:
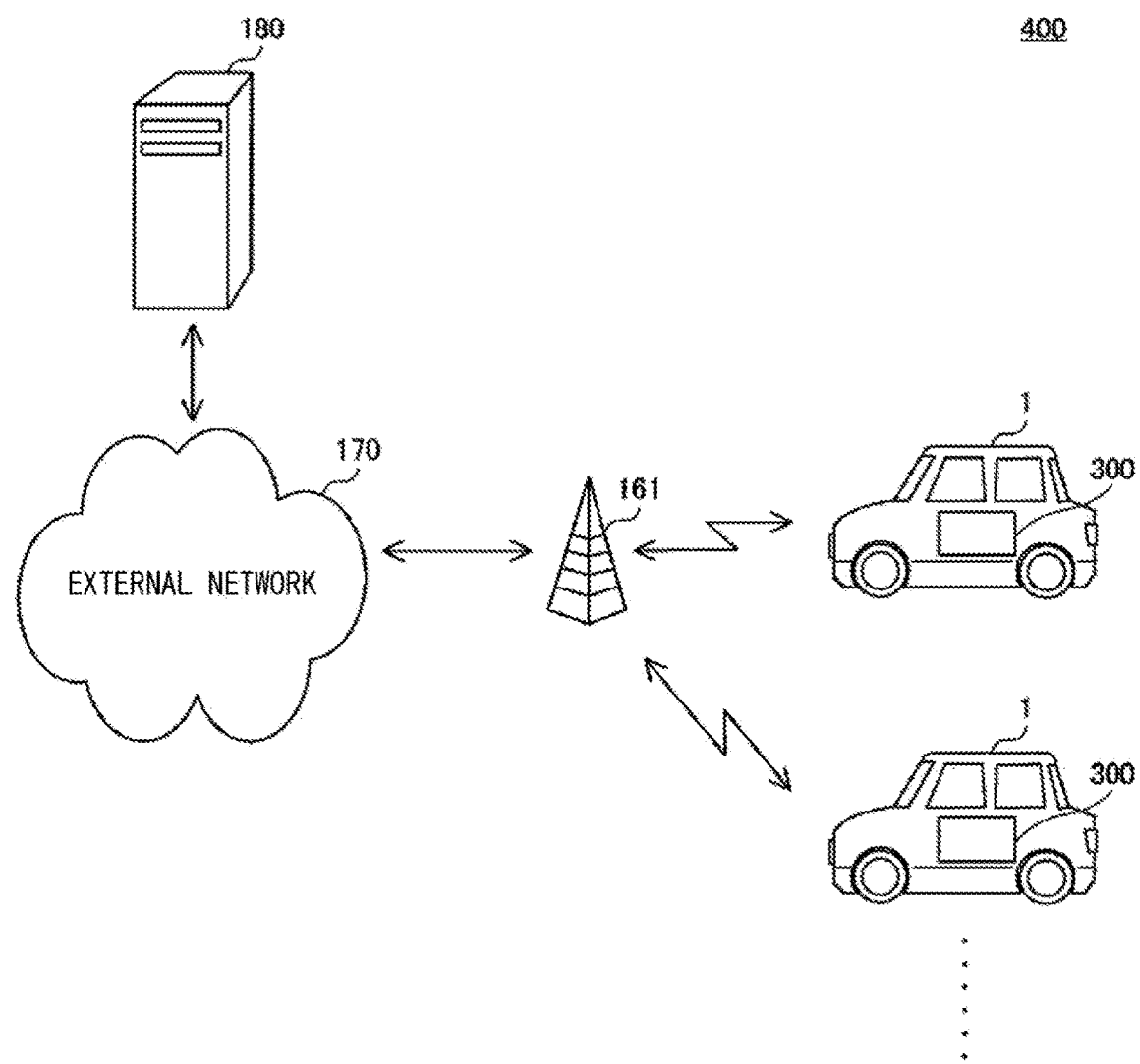
FIG. 1 shows a configuration of a communication system according to an embodiment of the present disclosure.

In recent years, as car sharing becomes widespread and demand for improved processing abilities of on-vehicle devices installed in a vehicle increases, it is desired to customize an on-vehicle network by adding applications to the on-vehicle network. Thus, a technology that enables various applications to be added and removed to and from the on-vehicle network according to a user's needs has been demanded.

Problems to be Solved by the Present Disclosure

Beyond the technologies described in PATENT LITERATURES 1 and 2, a technology capable of flexibly constructing a network of a new configuration while maintaining a stable operation in the network has been demanded.

The present disclosure has been made to solve the above problems and an object of the present disclosure is to provide a management device, a communication system, a vehicle, a vehicle communication management method, and a vehicle communication management program capable of flexibly constructing a network of a new configuration while maintaining a stable operation in the network.

Effects of the Present Disclosure

According to the present disclosure, it is possible to flexibly construct a network of a new configuration while maintaining a stable operation in the network.

Description of Embodiment of the Present Disclosure

First, contents of embodiments of the present disclosure are listed and described.

(1) A management device according to an embodiment of the present disclosure includes: a detection unit configured to detect addition of a function unit to a network including one or a plurality of on-vehicle function units; an acquisition unit configured to acquire function unit information of a new function unit that is the function unit the addition of which has been detected by the detection unit and function unit information of each on-vehicle function unit, each piece of function unit information including information regarding network configuration of a layer lower than an application layer; and a generation unit configured to, based on the pieces of function unit information acquired by the acquisition unit, generate configuration information of a new network that is the network further including the new function unit.

With the above configuration in which the respective pieces of function unit information each including the information regarding the network configuration of the layer lower than the application layer are acquired, and the configuration information of the new network is generated based on the acquired function unit information, it is possible to construct the new network while considering the network configuration of the layer lower than the application layer. Thus, it is possible to inhibit occurrence of a delay, in communication of high importance, which is caused by addition of a new function unit to the network, for example. Therefore, it is possible to flexibly construct a network of a new configuration while maintaining the stable operation in the network.

(2) Preferably, the management device further includes a notification unit configured to, based on the configuration information generated by the generation unit, notify at least one of the new function unit and the one or the plurality of on-vehicle function units which constitute the new network, of a setting content for performing communication in the new network.

With this configuration, the setting content of each function unit can be changed to an appropriate content according to specifications related to communication in the new network.

(3) Preferably, the function unit information is information that allows recognition of at least one of: specifications of a plurality of hardware devices in the new network and a topology of the new network; restriction on allocation of the new function unit and the on-vehicle function units to the hardware devices in the new network; and restriction on a communication method in the new network.

With this configuration, it is possible to construct the new network while considering various pieces of information regarding the new network.

(4) Preferably, the generation unit acquires feasibility information indicating feasibility of the new network and corresponding to the generated configuration information.

With this configuration, it is possible to construct, as a new network, a network the feasibility of which has been verified while considering the logical configuration and the physical configuration.

(5) Preferably, the generation unit changes a generation condition, based on the acquired feasibility information, and newly generates the configuration information according to the changed generation condition.

With this configuration, if it is difficult to construct a network based on the generated configuration information, it is possible to newly generate configuration information of a new network in which the additional content of the new function unit to the network is changed, for example. This enables more flexible construction of the new network.

(6) Preferably, the management device further includes a storage unit configured to store therein the configuration information generated by the generation unit.

With this configuration, when a new network is constructed by adding a new function unit to the existing network, a part or the entirety of the function unit information of the existing function units can be acquired from the configuration information, of the existing network, stored in the storage unit, thereby simplifying the network construction process.

(7) A vehicle according to the embodiment of the present disclosure includes the management device.

With this configuration, in the vehicle including the management device, a network of a new configuration can be flexibly constructed while maintaining the stable operation in the network.

(8) A vehicle communication system according to the embodiment of the present disclosure includes a management device, and one or a plurality of on-vehicle function units constructing a network. The management device detects addition of a function unit to the network, and acquires, from a new function unit that is the function unit the addition of which has been detected, function unit information including information regarding network configuration of a layer lower than an application layer. The one or the plurality of on-vehicle function units each transmit, to the management device, its own function unit information including information regarding network configuration of a layer lower than an application layer. The management device generates configuration information of a new network that is the network further including the new function unit, based on the function unit information acquired from the new function unit and on the function unit information received from the one or the plurality of on-vehicle function units.

With the above configuration in which the respective pieces of function unit information each including the information regarding the network configuration of the layer lower than the application layer are acquired, and the configuration information of the new network is generated based on the acquired function unit information, it is possible to construct the new network while considering the network configuration of the layer lower than the application layer. Thus, it is possible to inhibit occurrence of a delay, in communication of high importance, which is caused by addition of a new function unit to the network, for example. Therefore, it is possible to flexibly construct a network of a new configuration while maintaining the stable operation in the network.

(9) A vehicle communication management method according to the embodiment of the present disclosure is a method that is performed by a management device and includes: detecting addition of a function unit to a network including one or a plurality of on-vehicle function units; acquiring function unit information of the new function unit that is the function unit the addition of which has been detected and function unit information of each on-vehicle function unit, each piece of function unit information including information regarding network configuration of a layer lower than an application layer; and generating, based on the pieces of function unit information acquired, configuration information of a new network that is the network further including the new function unit.

In the above method in which the respective pieces of function unit information each including the information regarding the network configuration of the layer lower than the application layer are acquired, and the configuration information of the new network is generated based on the acquired function unit information, it is possible to construct the new network while considering the network configuration of the layer lower than the application layer. Thus, it is possible to inhibit occurrence of a delay, in communication of high importance, which is caused by addition of a new function unit to the network, for example. Therefore, it is possible to flexibly construct a network of a new configuration while maintaining the stable operation in the network.

(10) A vehicle communication management method according to the embodiment of the present disclosure is a method that is performed in a vehicle communication system including a management device and one or a plurality of on-vehicle function units constructing a network, and the method includes: a step in which the management device detects addition of a function unit to the network, and acquires, from a new function unit that is the function unit the addition of which has been detected, function unit information including information regarding network configuration of a layer lower than an application layer; a step in which the one or the plurality of on-vehicle function units each transmit, to the management device, its own function unit information including information regarding network configuration of a layer lower than an application layer; and a step in which the management device generates configuration information of a new network that is the network further including the new function unit, based on the function unit information acquired from the new function unit and on the function unit information received from the one or the plurality of on-vehicle function units.

In the above method in which the respective pieces of function unit information each including the information regarding the network configuration of the layer lower than the application layer are acquired, and the configuration information of the new network is generated based on the acquired function unit information, it is possible to construct the new network while considering the network configuration of the layer lower than the application layer. Thus, it is possible to inhibit occurrence of a delay, in communication of high importance, which is caused by addition of a new function unit to the network, for example. Therefore, it is possible to flexibly construct a network of a new configuration while maintaining the stable operation in the network.

(11) A vehicle communication management program according to the embodiment of the present disclosure is a program used in a management device, and the program causes a computer to function as: a detection unit configured to detect addition of a function unit to a network including one or a plurality of on-vehicle function units; an acquisition unit configured to acquire function unit information of a new function unit that is the function unit the addition of which has been detected by the detection unit and function unit information of each on-vehicle function unit, each piece of function unit information including information regarding network configuration of a layer lower than an application layer; and a generation unit configured to, based on the pieces of function unit information acquired by the acquisition unit, generate configuration information of a new network that is the network further including the new function unit.

With the above configuration in which the respective pieces of function unit information each including the information regarding the network configuration of the layer lower than the application layer are acquired, and the configuration information of the new network is generated based on the acquired function unit information, it is possible to construct the new network while considering the network configuration of the layer lower than the application layer. Thus, it is possible to inhibit occurrence of a delay, in communication of high importance, which is caused by addition of a new function unit to the network, for example. Therefore, it is possible to flexibly construct a network of a new configuration while maintaining the stable operation in the network.

Hereinafter, embodiments of the present disclosure will be described with reference to the drawings. In the drawings, the same or corresponding parts are denoted by the same reference signs, and descriptions thereof are not repeated. At least some parts of the embodiments described below can be combined together as desired.

Vehicle Communication System

FIG. 1 shows a configuration of a communication system according to an embodiment of the present disclosure.

With reference to FIG. 1, a communication system 400 includes a server 180 and one or a plurality of vehicle communication systems 300. Each vehicle communication system 300 is installed in a vehicle 1.

Figure 2:
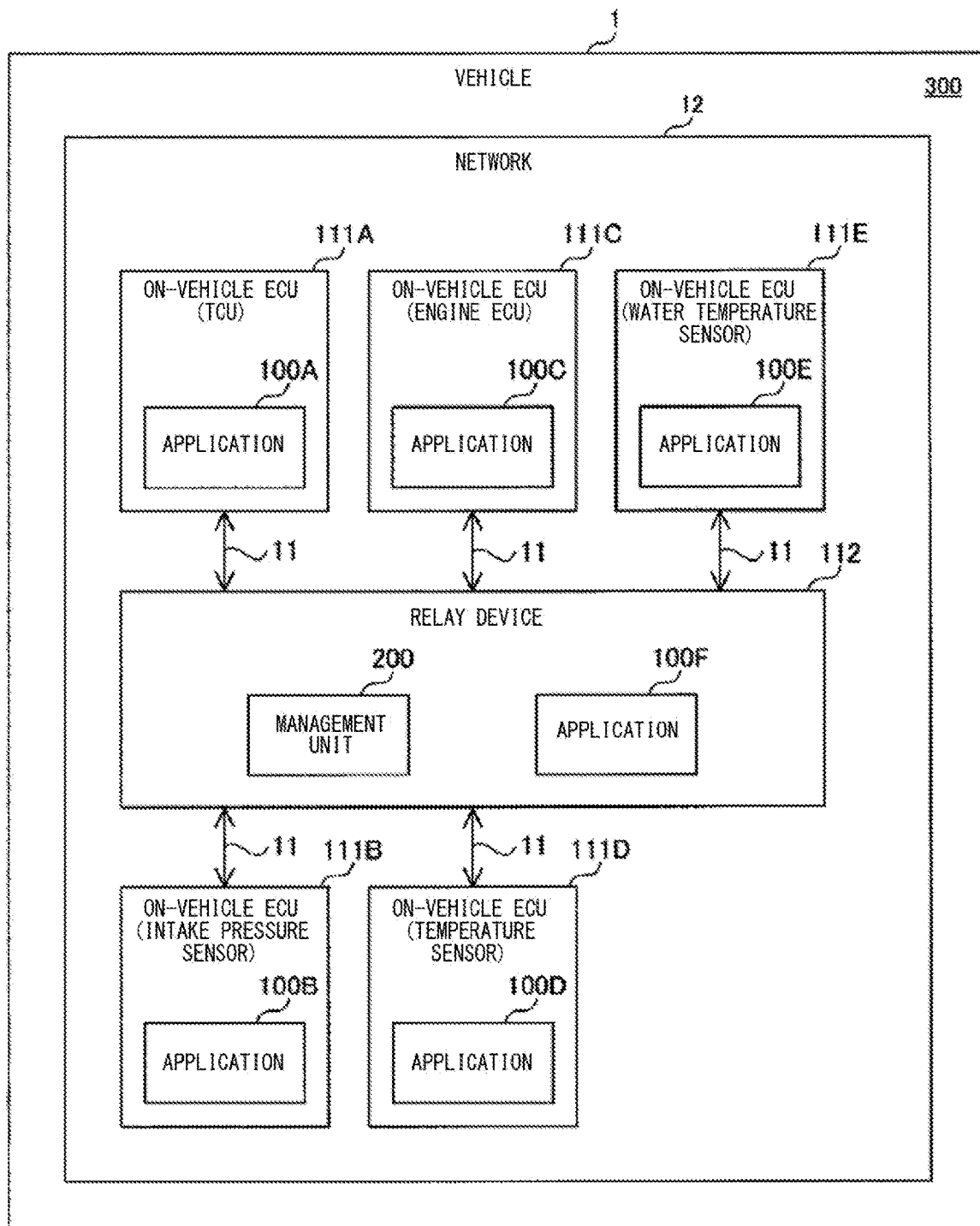
FIG. 2 shows an example of a configuration of a vehicle communication system according to the embodiment of the present disclosure.

FIG. 2 shows an example of a configuration of a vehicle communication system according to the embodiment of the present disclosure.

With reference to FIG. 2, the vehicle communication system 300 includes one or a plurality of on-vehicle ECUs (Electronic Control Units) 111, and a relay device 112. Specifically, the vehicle communication system 300 includes on-vehicle ECUs 111A to 111E as the on-vehicle ECUs 111. The relay device 112 includes a management unit 200.

Each of the on-vehicle ECUs 111A to 111E and the relay device 112 includes an application 100.

In more detail, the on-vehicle ECU 111A includes an application 100A, the on-vehicle ECU 111B includes an application 100B, the on-vehicle ECU 111C includes an application 100C, the on-vehicle ECU 111D includes an application 100D, the on-vehicle ECU 111E includes an application 100E, and the relay device 112 includes an application 100F.

The on-vehicle ECUs 111A to 111E and the relay device 112 construct a network 12.

Of function units, i.e., objects, in the network 12, the on-vehicle ECUs 111 and the applications 100 are examples of on-vehicle function units that are function units installed in the vehicle 1. The relay device 112 is an example of a management device.

The vehicle communication system 300 may not necessarily include five on-vehicle ECUs 111, and may include one, two, three, four, six or more on-vehicles ECU 111. Moreover, in the vehicle communication system 300, one on-vehicle ECU 111 may not necessarily be provided with one application 100, and may be provided with two or more applications 100.

The vehicle communication system 300 may not necessarily include one relay device 112, and may include a plurality of relay devices 112. Moreover, in the vehicle communication system 300, one relay device 112 may not necessarily be provided with one application 100, and may be provided with two or more applications 100.

The network 12 may include, as function units, i.e., objects, an external device placed outside the vehicle 1 and an application included in this external device.

Examples of the on-vehicle ECUs 111 include a TCU (Telematics Communication Unit), an automated driving ECU, an engine ECU, a sensor, a navigation device, a human/machine interface, and a camera.

In this example, the on-vehicle ECUs 111A, 111B, 111C, 111D, and 111E are a TCU, an intake pressure sensor, an engine ECU, a temperature sensor, and a water temperature sensor, respectively.

Hereinafter, the on-vehicle ECUs 111A, 111B, 111C, 111D, and 111E are also referred to as a TCU 111A, an intake pressure sensor 111B, an engine ECU 111C, a temperature sensor 111D, and a water temperature 111E, respectively.

In the network 12, the on-vehicle ECUs 111A to 111E are each connected to the relay device 112 via an Ethernet (registered trademark) cable 11.

The relay device 112 is, for example, a gateway device, and is capable of relaying data between the plurality of on-vehicle ECUs 111 connected thereto.

The relay device 112 performs an Ethernet frame relaying process in accordance with a communication standard of Ethernet. Specifically, the relay device 112 relays, for example, an Ethernet frame that is exchanged between the on-vehicle ECUs 111. An IP packet is stored in the Ethernet frame.

In the vehicle communication system 300, the Ethernet frame relaying process may not necessarily be performed in accordance with the communication standard of Ethernet. For example, data may be relayed in accordance with any of communication standards such as CAN (Controller Area Network) (registered trademark), FlexRay (registered trademark), MOST (Media Oriented Systems Transport) (registered trademark), and LIN (Local Interconnect Network).

With reference to FIG. 1 and FIG. 2, the TCU 111A is capable of communicating with the server 180. Specifically, the TCU 111A is capable of communicating with the server 180 via a wireless base station device 161 by using an IP packet.

More specifically, the TCU 111A is capable of wirelessly communicating with the wireless base station device 161 in accordance with a communication standard such as LTE (Long Term Evolution) or 3G.

Specifically, upon receiving an IP packet from the server 180 via an external network 170, the wireless base station device 161 inserts the received IP packet in a wireless signal, and transmits the wireless signal to the TCU 111A.

Upon receiving, from the wireless base station device 161, the wireless signal including the IP packet from the server 180, for example, the TCU 111A acquires the IP packet from the received wireless signal, stores the acquired IP packet in an Ethernet frame, and transmits the Ethernet frame to the relay device 112.

Upon receiving an Ethernet frame from the relay device 112, the TCU 111A acquires an IP packet from the received Ethernet frame, inserts the acquired IP packet in a wireless signal, and transmits the wireless signal to the wireless base station device 161.

Upon receiving the wireless signal from the TCU 111A, the wireless base station device 161 acquires the IP packet from the received wireless signal, and transmits the acquired IP packet to the server 180 via the external network 170.

The intake pressure sensor 111B is capable of communicating with another on-vehicle ECU 111 via the relay device 112, and, for example, periodically measures the intake pressure of the engine in the vehicle 1.

The engine ECU 111C is capable of communicating with another on-vehicle ECU 111 via the relay device 112, and, for example, controls the engine in the vehicle 1.

In more detail, for example, the engine ECU 111C acquires information indicating the rotation speed of the engine, the vehicle speed of the vehicle 1, the shaft torque of the engine, the state of the transmission, the state of a throttle valve, measurement values of the sensors, and the like, and controls the engine, based on the acquired information.

The engine ECU 111C is capable of transmitting a part or the entirety of the acquired information to the relay device 112, in response to a request from the relay device 112, for example.

The temperature sensor 111D is capable of communicating with another on-vehicle ECU 111 via the relay device 112, and, for example, periodically measures the ambient temperature of the vehicle 1.

The water temperature 111E is capable of communicating with another on-vehicle ECU 111 via the relay device 112, and, for example, periodically measures the temperature of cooling water circulating inside the engine in the vehicle 1.

Each application 100 performs, for example, an application layer process to perform a predetermined process in the on-vehicle ECU 111 or the relay device 112 in which the application 100 is installed. For example, the application 100D in the temperature sensor 111D generates, in a predetermined cycle, temperature information indicating the ambient temperature of the vehicle 1.

Figure 3:
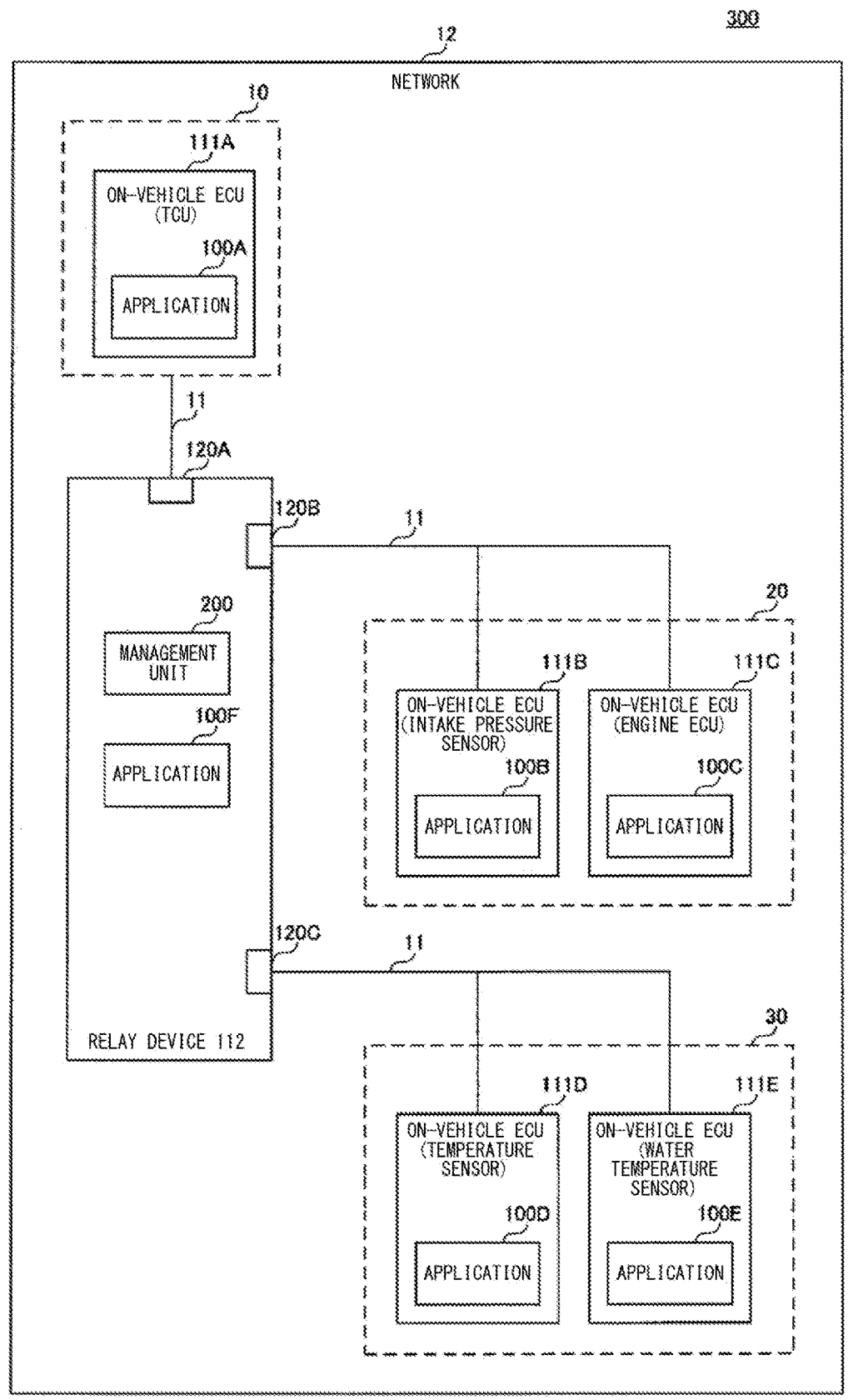
FIG. 3 shows an example of a network configuration in the vehicle communication system according to the embodiment of the present disclosure.

FIG. 3 shows an example of a network configuration in the vehicle communication system according to the embodiment of the present disclosure.

With reference to FIG. 3, the relay device 112 includes communication ports 120A, 120B, and 120C. Each of the communication ports 120A, 120B, and 120C is also referred to as a communication port 120. The communication port 120 is a terminal connectable with an Ethernet cable 11.

In the example shown in FIG. 3, the TCU 111A is connected to the communication port 120A, the intake pressure sensor 111B and the engine ECU 111C are connected to the communication port 120B, and the temperature sensor 111D and the water temperature 111E are connected to the communication port 120C.

In the network 12, the TCU 111A belongs to a VLAN (Virtual Local Area Network) 10. The intake pressure sensor 111B and the engine ECU 111C belong to a VLAN 20 different from the VLAN 10. The temperature sensor 111D and the water temperature 111E belong to a VLAN 30 different from the VLAN 10 and the VLAN 20.

The relay device 112 performs, for example, relaying of an Ethernet frame between the on-vehicle ECUs 111 that belong to the same VLAN. Specifically, based on a transmission source MAC (Media Access Control) address and a transmission destination MAC address included in a received Ethernet frame, the relay device 112 transmits the Ethernet frame to a destination on-vehicle ECU 111.

Moreover, the relay device 112 performs, for example, relaying of an IP packet between the on-vehicle ECUs 111 that belong to different VLANs. Specifically, the relay device 112 acquires an IP packet from the received Ethernet frame, and transmits the IP packet to a destination on-vehicle ECU 111, based on a destination IP address of the acquired IP packet.

Management Unit

Figure 4:
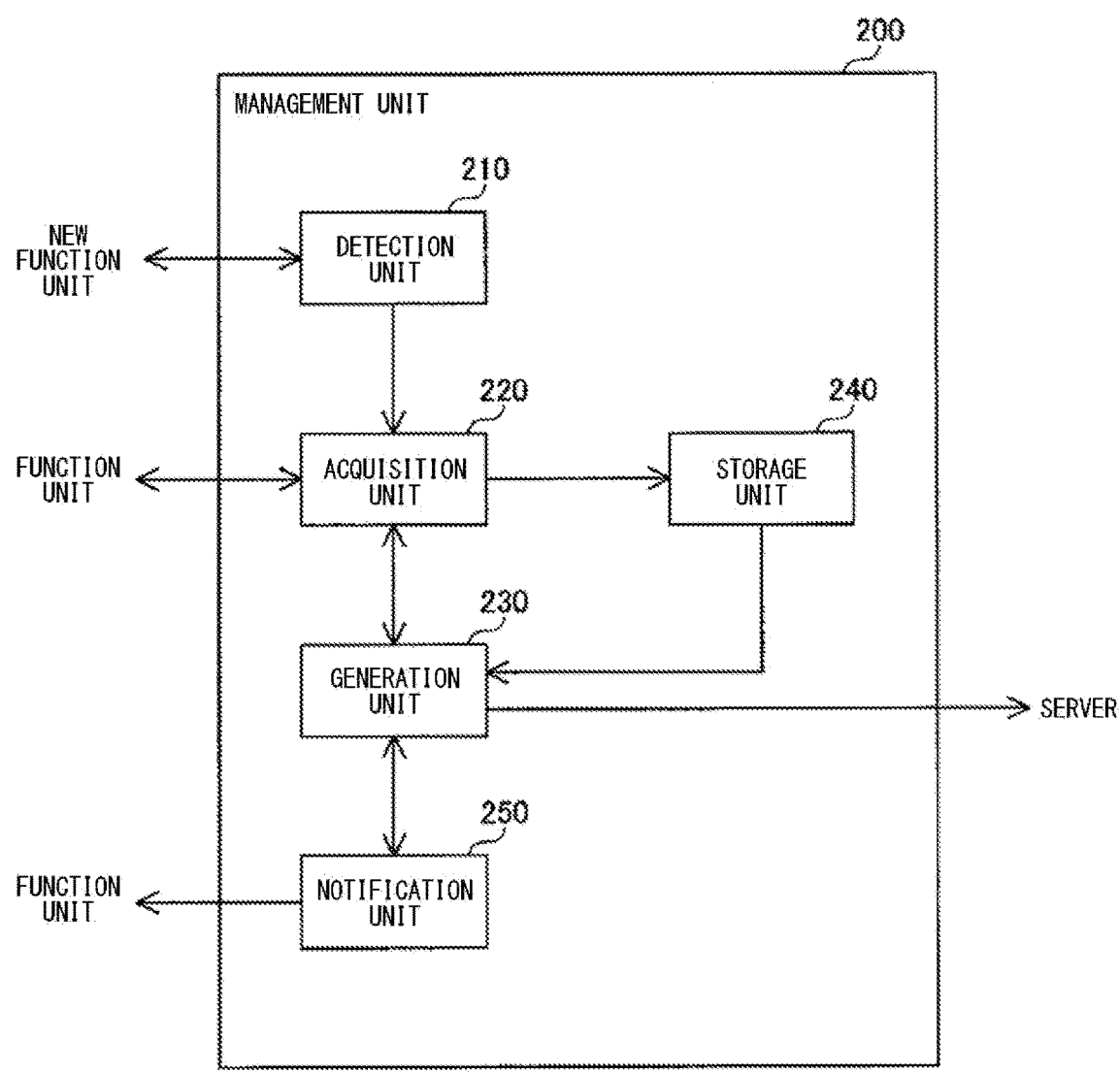
FIG. 4 shows a configuration of a management unit according to the embodiment of the present disclosure.

FIG. 4 shows the configuration of a management unit according to the embodiment of the present disclosure.

With reference to FIG. 4, the management unit 200 includes a detection unit 210, an acquisition unit 220, a generation unit 230, a storage unit 240, and a notification unit 250. The storage unit 240 is a flash memory, for example.

The detection unit 210, the acquisition unit 220, the generation unit 230, and the notification unit 250 are implemented by, for example, a processor such as a CPU (Central Processing Unit) or a DSP (Digital Signal Processor).

Detection Unit

The detection unit 210 detects a new function unit that is a function unit to be newly added to the network 12. That is, the detection unit 210 detects addition of the new function unit to the network 12. In more detail, the detection unit 210 detects addition of an on-vehicle ECU 111, an external device, an application 100, etc., to the network 12. As one example, the detection unit 210 detects, as a new ECU, an on-vehicle ECU 111 to be newly added to the network 12.

For example, the new function unit transmits, to the detection unit 210, connection request information for requesting communication connection in the network 12.

Upon receiving the connection request information, the detection unit 210 detects the new function unit that is a transmission source of the connection request information.

The detection unit 210 may for example, periodically broadcast a search message for detecting a new function unit. In this case, the new function unit receives the search message, and transmits the connection request information as a response to the received search message.

Hereinafter, the network 12 including a new function unit is also referred to as a new network, the network 12 before addition of a new function unit is also referred to as an existing network, and a function unit included in the existing network is also referred to as an existing function unit. An on-vehicle ECU 111 included in the existing network is an example of an existing function unit, i.e., an existing ECU.

Figure 5:
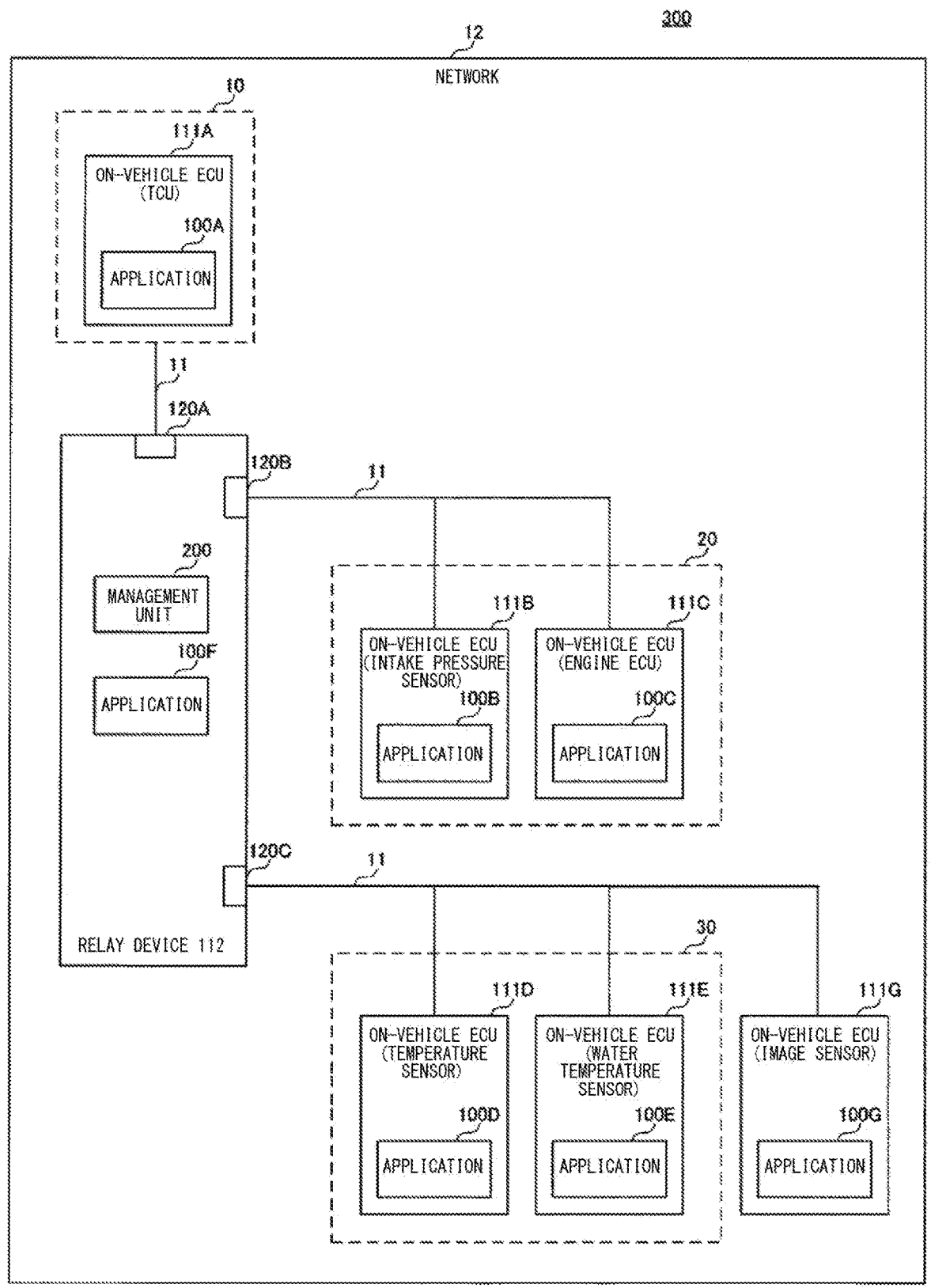
FIG. 5 shows an example of a configuration of a new network in the vehicle communication system according to the embodiment of the present disclosure.

FIG. 5 shows an example of a configuration of a new network in the vehicle communication system according to the embodiment of the present disclosure.

With reference to FIG. 5, it is assumed that an on-vehicle ECU 111G is newly added to the network 12. In this example, the on-vehicle ECU 111G is an image sensor. Hereinafter, the on-vehicle ECU 111G is also referred to as an image sensor 111G. The image sensor 111G includes an application 100G as a new function unit.

When the image sensor 111G receives supply of power and is connected to the communication port 120C in the relay device 112 via the Ethernet cable 11, for example, the image sensor 111G transmits, to the detection unit 210, connection request information for requesting communication connection in the network 12.

In more detail, the application 100G in the image sensor 111G generates an Ethernet frame including the connection request information, its own ID, and the MAC address of the relay device 112 as a transmission destination MAC address, and transmits the generated Ethernet frame to the relay device 112.

Upon receiving the Ethernet frame transmitted from the application 100G, the detection unit 210 in the relay device 112 performs an authentication process for the application 100G by using the ID and the like included in the received Ethernet frame.

When the authentication of the application 100G has been successful, the detection unit 210 generates an Ethernet frame including authentication success information indicating that the authentication has been successful, and the MAC address of the image sensor 111G as a transmission destination MAC address, and transmits the generated Ethernet frame to the image sensor 111G.

A new function unit to be detected by the detection unit 210 is not limited to the application 100 included in the on-vehicle ECU 111 to be newly connected to the relay device 112. For example, the detection unit 210 may detect, as a new function unit, an application 100 to be installed in an on-vehicle ECU 111 in the existing network.

Figure 6:
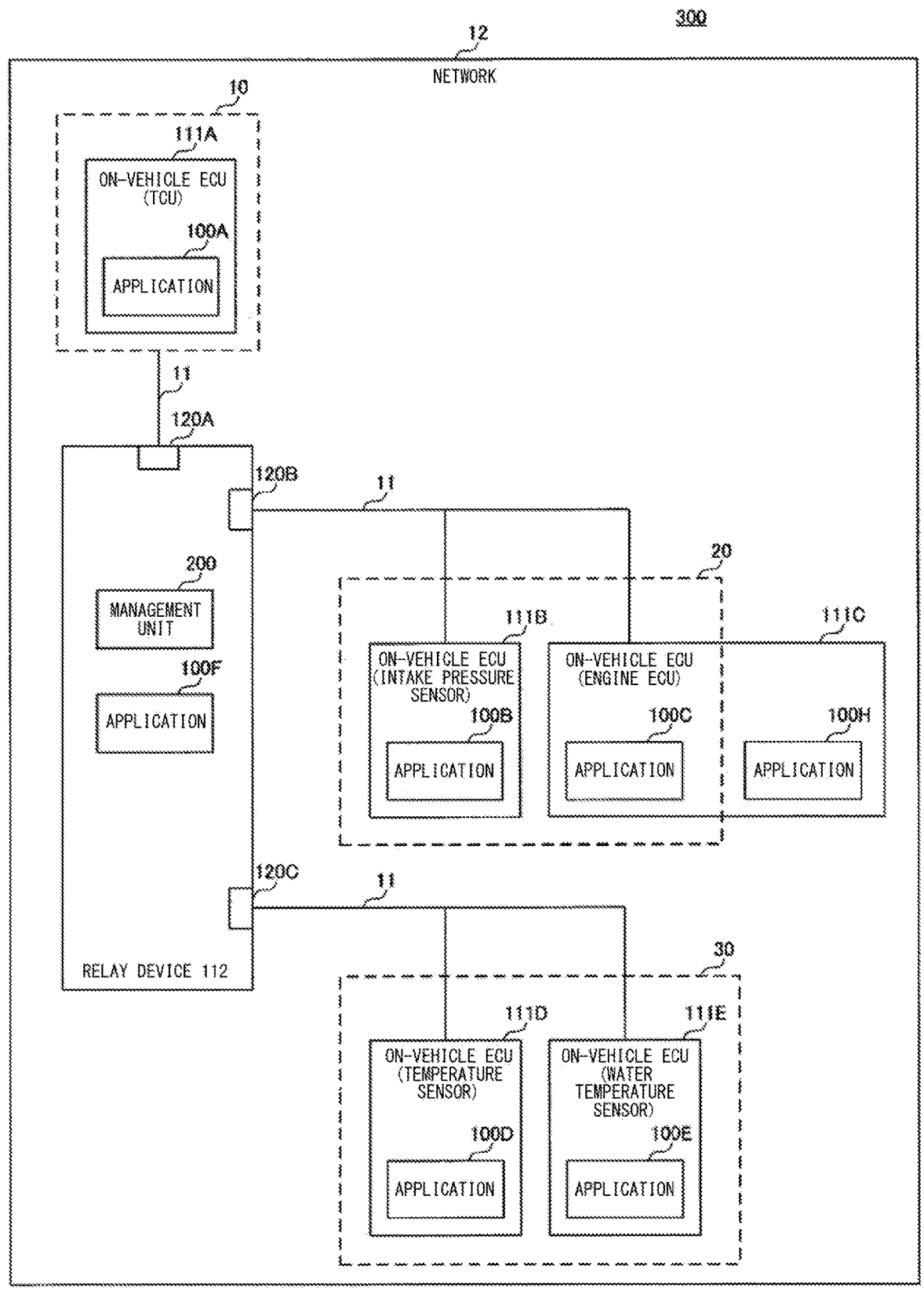
FIG. 6 shows another example of the configuration of the new network in the vehicle communication system according to the embodiment of the present disclosure.

FIG. 6 shows another example of the configuration of a new network in the vehicle communication system according to the embodiment of the present disclosure.

With reference to FIG. 6, it is assumed that, in the network 12, an application 100H is newly installed as a new function unit in the engine ECU 111C that is the existing function unit.

When the application 100H has been installed in the engine ECU 111C, the application 100H generates an Ethernet frame including connection request information, its own ID, and the MAC address of the relay device 112 as a transmission destination MAC address, and transmits the generated Ethernet frame to the relay device 112.

Upon receiving the Ethernet frame transmitted from the application 100H, the detection unit 210 in the relay device 112 performs an authentication process for the application 100H by using the ID and the like included in the received Ethernet frame.

When the authentication of the application 100H has been successful, the detection unit 210 generates an Ethernet frame including authentication success information indicating that the authentication has been successful, and the MAC address of the engine ECU 111C as a transmission destination MAC address, and transmits the generated Ethernet frame to the engine ECU 111C.

A new function unit to be detected by the detection unit 210 is not limited to the application 100 included in the on-vehicle ECU 111 to be newly connected to the relay device 112 or the application 100 to be installed in the on-vehicle ECU 111, as described above. For example, the detection unit 210 may detect, as a new function unit, an application 100 included in an external device 113 to be added to the network 12 outside the vehicle 1.

Figure 7:
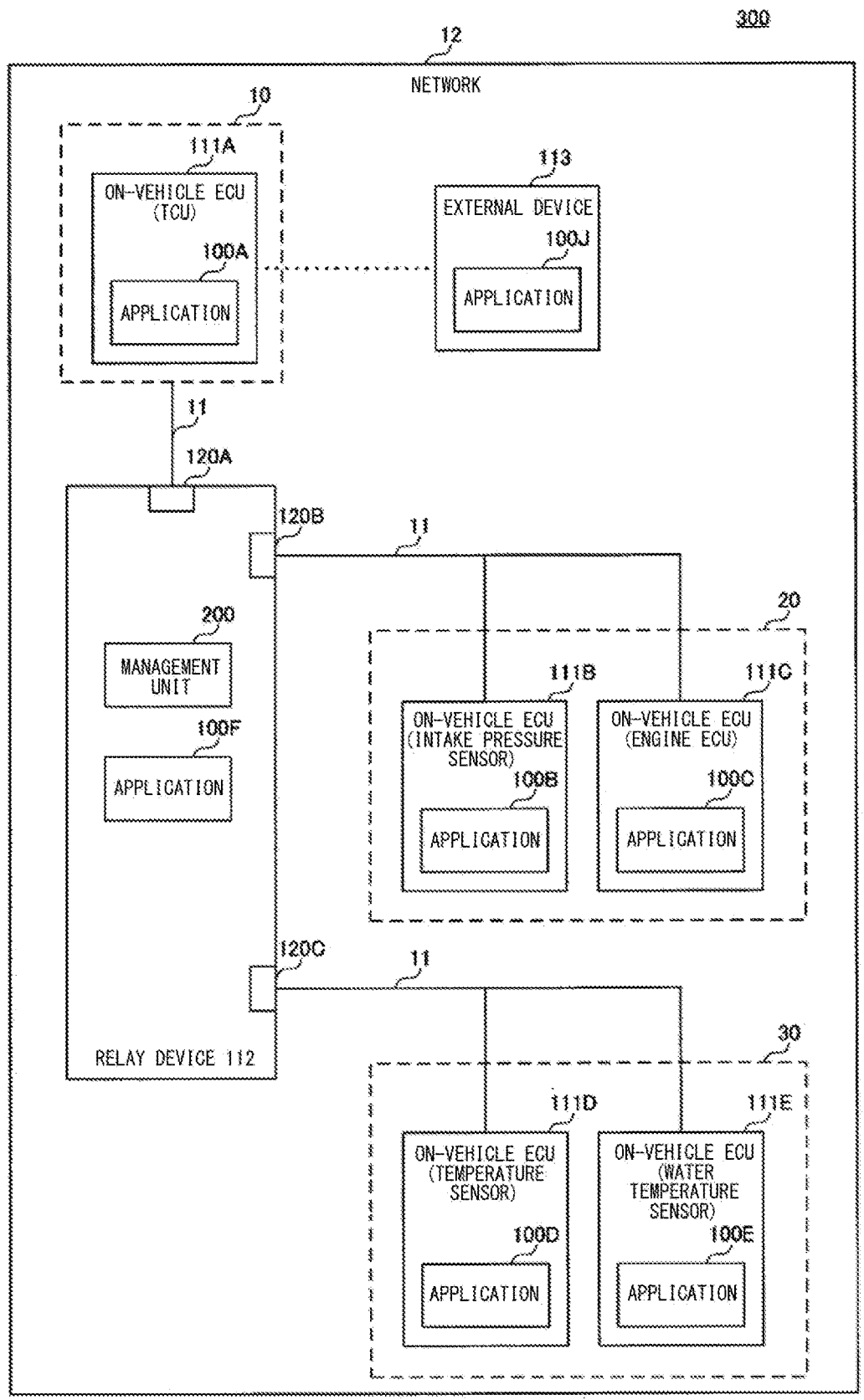
FIG. 7 shows another example of the configuration of the new network in the vehicle communication system according to the embodiment of the present disclosure.

FIG. 7 shows another example of the configuration of a new network in the vehicle communication system according to the embodiment of the present disclosure.

With reference to FIG. 7, it is assumed that an external device 113 is newly added to the network 12. The external device 113 is a device placed outside the vehicle 1. The external device 113 includes an application 100J as a new function unit.

The external device 113 is capable of communicating with the TCU 111A. In more detail, the external device 113 is capable of communicating with the TCU 111A via the wireless base station device 161 by using an IP packet, for example.

The external device 113 transmits connection request information for requesting communication connection in the network 12, to the detection unit 210 via the TCU 111A.

In more detail, the application 100J in the external device 113 transmits an IP packet including the connection request information, its own ID, and the MAC address of the relay device 112, to the wireless base station device 161 via the external network 170.

Upon receiving the IP packet from the external device 113 via the external network 170, the wireless base station device 161 inserts the received IP packet in a wireless signal, and transmits the wireless signal to the TCU 111A.

Upon receiving, from the wireless base station device 161, the wireless signal including the IP packet from the application 100J, the TCU 111A acquires the IP packet from the received wireless signal, generates an Ethernet frame including the acquired IP packet and the MAC address of the relay device 112 as a transmission destination MAC address, and transmits the generated Ethernet frame to the relay device 112.

Upon receiving the Ethernet frame from the TCU 111A, the detection unit 210 in the relay device 112 performs an authentication process for the application 100J by using the ID and the like included in the IP packet stored in the received Ethernet frame.

When the authentication of the application 100J has been successful, the detection unit 210 generates an Ethernet frame including authentication success information indicating that the authentication has been successful, and the MAC address of the external device 113 as a transmission destination MAC address, and transmits the generated Ethernet frame to the TCU 111A.

Upon receiving the Ethernet frame from the detection unit 210, the TCU 111A acquires the IP packet from the received Ethernet frame, inserts the acquired IP packet in a wireless signal, and transmits the wireless signal to the external device 113 via the wireless base station device 161.

When the authentication of the new function unit has been successful, the detection unit 210 outputs detection information indicating the ID of the new function unit to the acquisition unit 220.

Acquisition Unit

The acquisition unit 220 acquires function unit information, of a new function unit and an on-vehicle function unit, which includes information regarding a network configuration of a layer lower than an application layer.

In more detail, upon receiving detection information from the detection unit 210, the acquisition unit 220 acquires the function unit information of the new function unit indicated by the detection information, and acquires the function unit information of the existing function unit.

For example, the acquisition unit 220 acquires, as function unit information, information that allows recognition of at least one of: specifications of hardware devices such as the on-vehicle ECUs 111, the relay device 112, and the external device 113 in the new network, and the topology of the new network; restriction on allocation of the applications 100 to the hardware devices in the new network; and restriction on the communication method in the new network.

The acquisition unit 220 acquires, as the information that allows recognition of the specification of each hardware device and the topology of the new network, at least one type of information among: information regarding the hardware device, such as the identifier, the name, the device type such as the sensor type, the memory size, the number of physical ports provided for each communication protocol, the identifier of each physical port, the power supply configuration, the power consumption, the VLAN ID, the sub-net address, and the function domain; information regarding the specification of the CPU (Central Processing Unit) or the GPU (Graphics Processing Unit) installed in the hardware device; information regarding the connection relationship between the hardware devices; information regarding the band width of communication between the hardware devices; and information regarding the specification of the relay device 112.

The acquisition unit 220 acquires, as the information that allows recognition of restriction on allocation of each application 100 to the hardware devices, at least one type of information among: information regarding restriction on the calculation speed required for execution, the memory usage, or the OS (Operating System) environment of the application 100; and information regarding restriction on the communication protocol such as TCP (Transmission Control Protocol) or UDP (User datagram Protocol).

The acquisition unit 220 acquires, as the information that allows recognition of restriction on the communication method in the new network, at least one type of information among: the communication data size; the communication frequency; whether or not burst transmission is required; allowable delay time; allowable loss; the required security level; the operation timing; the communication type indicating, for example, periodic communication or non-periodic communication; the identifier of an application 100 as a communication partner; the messaging method indicating a request-response mode, a publish-subscribe mode, or the like; and information regarding the priority of communication by the application 100.

For example, the acquisition unit 220 specifies, among the different types of function unit information as described above, one or a plurality of types of function unit information necessary for generation of configuration information of the new network by the generation unit 230. Hereinafter, each of the one or the plurality of types of function unit information specified by the acquisition unit 220 is also referred to as target information.

The acquisition unit 220 transmits an information request notification indicating that the target information should be transmitted, to the existing function unit and the new function unit.

As a response to the information request notification received from the acquisition unit 220, the existing function unit and the new function unit each transmit, to the acquisition unit 220, its own function unit information of the type designated in the information request notification, for example.

The acquisition unit 220 may acquire a part or the entirety of the pieces of function unit information of the respective existing function units from the storage unit 240.

In more detail, the storage unit 240 sometimes stores therein the configuration information of the existing network. In addition, the configuration information of the existing network sometimes includes the function unit information of each existing function unit, e.g., information regarding the topology of the hardware device.

The acquisition unit 220 refers to the storage unit 240, and when the configuration information of the existing network is registered in the storage unit 240 and the configuration information includes the function unit information of the existing function unit, the acquisition unit 220 acquires the function unit information from the storage unit 240.

Among the pieces of target information regarding the respective existing function units, if there is function unit information that could not be acquired from the configuration information of the existing network in the storage unit 240, in other words, if there is lacking information, the acquisition unit 220 transmits an information request notification for requesting the lacking information to the one or the plurality of existing function units.

For example, as for a certain existing function unit, when all the types of target information thereof could not be acquired from the storage unit 240, the acquisition unit 220 transmits, to the existing function unit, an information request notification for requesting all the types of target information.

Meanwhile, for example, as for one or a plurality of existing function units, when a part of the plurality of types of target information could not be acquired from the storage unit 240, the acquisition unit 220 transmits an information request notification for requesting the part of the plurality of types of target information to the one or the plurality of existing function units.

Each existing function unit transmits, to the acquisition unit 220, its own function unit information of the type designated in the information request notification.

The acquisition unit 220 outputs, to the generation unit 230, the pieces of function unit information acquired as described above.

Generation Unit

The generation unit 230 generates configuration information of a new network, based on the pieces of function unit information received from the acquisition unit 220.

In more detail, the generation unit 230 generates configuration information indicating setting contents of the existing function unit and the new function unit for performing communication in the new network.

For example, based on the pieces of function unit information received from the acquisition unit 220, the generation unit 230 generates configuration information indicating the setting contents, of the respective function units in the new network, which allow the function units to perform communication at layer 4 or lower in the OSI (Open Systems Interconnection) reference model, while considering the logical configuration and the physical configuration of the new network.

FIG. 8 shows an example of the configuration information generated by the generation unit according to the embodiment of the present disclosure.

In the following, for convenience, the port numbers of the communication ports 120A, 120B, and 120C of the relay device 112 are "1", "2", and "3", respectively. In addition, each on-vehicle ECU 111 includes one communication port, and the port number of the communication port is "1".

With reference to FIG. 8, the generation unit 230 generates configuration information indicating the setting contents of the respective function units in the new network, e.g., IDs of VLANs for the respective communication ports 120. For example, in the new network shown in FIG. 5, the generation unit 230 generates configuration information indicating the content that "VLAN30" is set as the ID of the VLAN to which the image sensor 111G including the application 100G as a new function unit belongs.

The generation unit 230 outputs the generated configuration information to the notification unit 250, and registers the configuration information in the storage unit 240.

Upon receiving the configuration information from the generation unit 230, the notification unit 250, based on the received configuration information, notifies at least one of the function units in the new network of the setting content for performing communication in the new network.

For example, based on the configuration information received from the generation unit 230, the notification unit 250 notifies a function unit that needs setting change, of the setting content. When a function unit that needs setting change is not present in the new network, the notification unit 250 does not perform notification of the setting content. For example, in the example shown in FIG. 8, the notification unit 250 assigns an IP address corresponding to the VLAN 30 to the image sensor 111G including the application 100G, and notifies the image sensor 111G of the assigned IP address.

Alternatively, the notification unit 250 notifies all the function units in the new network of the setting contents, based on the configuration information received from the generation unit 230. That is, the notification unit 250 notifies all the function units in the new network of the setting contents regardless of whether or not the function units need setting change.

Upon being notified of the setting content from the notification unit 250, each function unit in the new network changes various settings according to the notified setting contents. The function units in the new network communicate with each other according to the changed setting contents.

Figure 9:
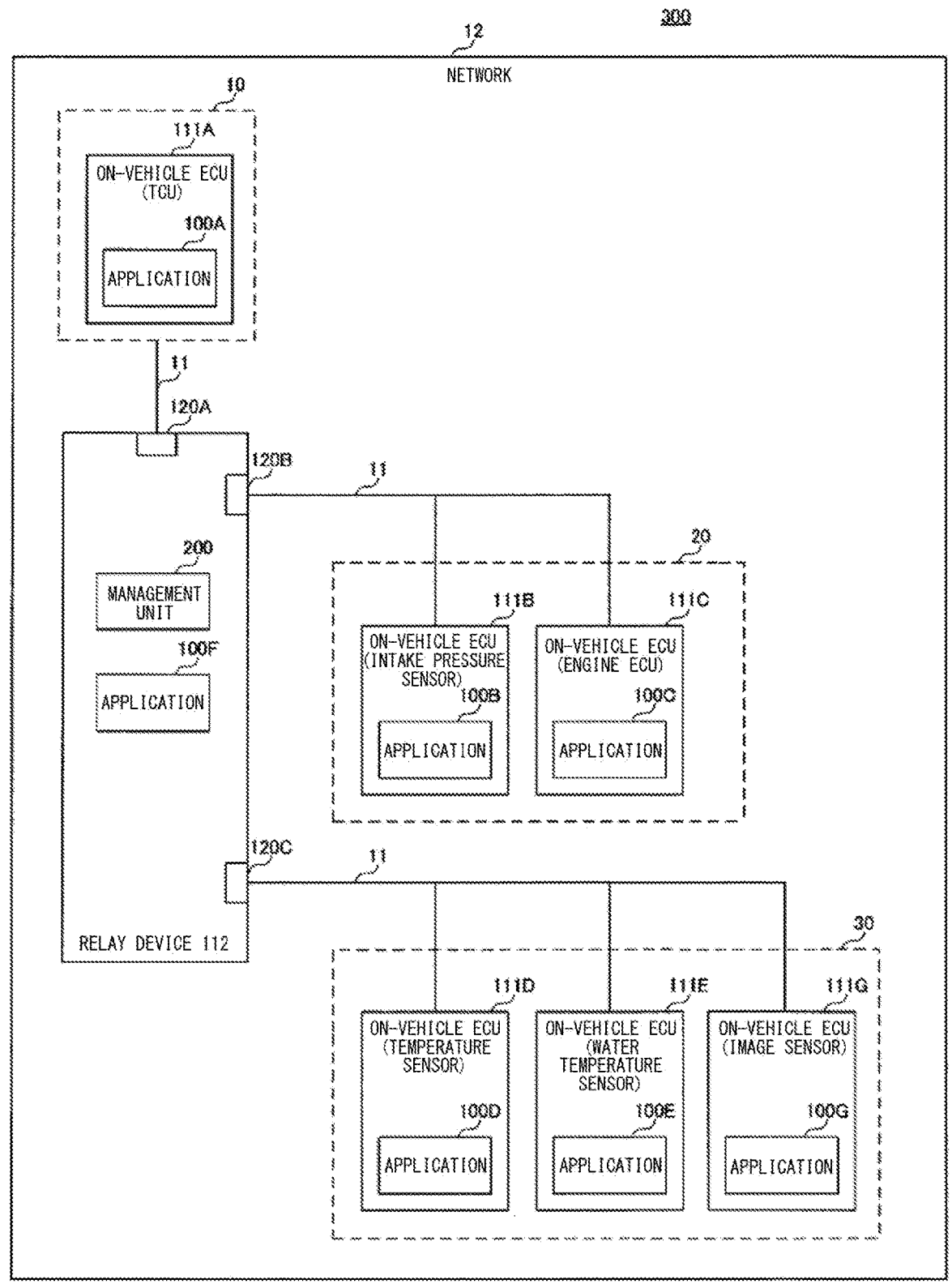
FIG. 9 shows an example of the configuration of a new network after setting change in the vehicle communication system according to the embodiment of the present disclosure.

FIG. 9 shows an example of a configuration of a new network after setting change, in the vehicle communication system according to the embodiment of the present disclosure.

With reference to FIG. 9, in the new network shown in FIG. 5, the image sensor 111G can perform communication in the VLAN 30 by performing setting change using the IP address notified from the notification unit 250.

FIG. 10 shows another example of the configuration information generated by the generation unit according to the embodiment of the present disclosure.

With reference to FIG. 10, for example, in the new network shown in FIG. 5, the generation unit 230 generates configuration information indicating the content that "VLAN20" is set as the ID of the VLAN to which the image sensor 111G including the application 100G as a new function unit belongs, and "VLAN20" is additionally set as the ID of the VLAN corresponding to the communication port 120C of the relay device 112 including the application 100F.

The generation unit 230 outputs the generated configuration information to the notification unit 250. Based on the configuration information received from the generation unit 230, the notification unit 250 notifies the image sensor 111G and the relay device 112 of the setting contents.

Figure 11:
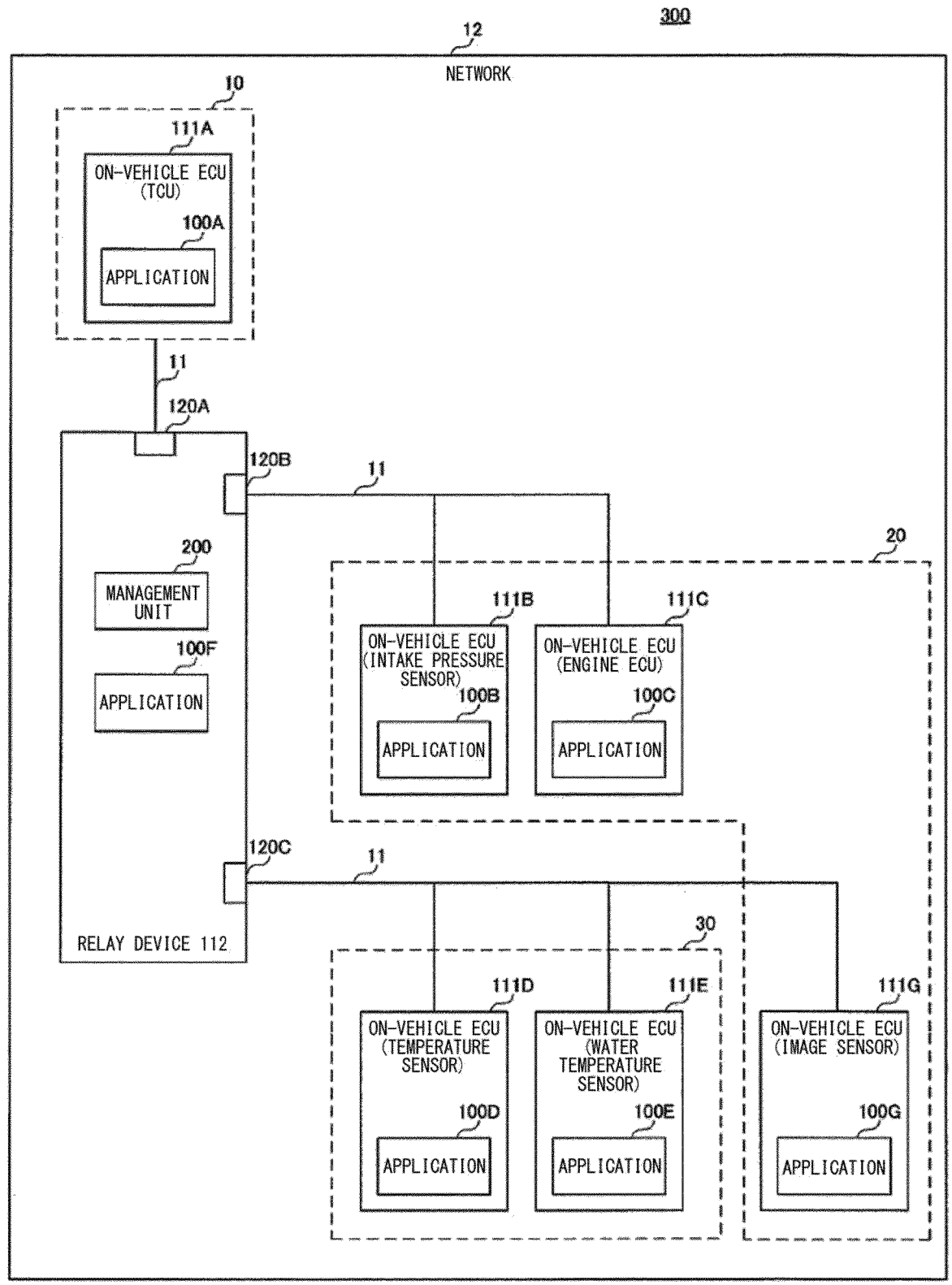
FIG. 11 shows another example of the new network after setting change in the vehicle communication system according to the embodiment of the present disclosure.

FIG. 11 shows another example of the configuration of the new network after setting change, in the vehicle communication system according to the embodiment of the present disclosure.

With reference to FIG. 11, in the new network shown in FIG. 5, the image sensor 111G and the relay device 112 perform setting change by using the setting contents notified from the notification unit 250. Thus, the image sensor 111G becomes able to perform communication in the VLAN 20.

FIG. 12 shows another example of the configuration information generated by the generation unit according to the embodiment of the present disclosure.

With reference to FIG. 12, for example, in the new network shown in FIG. 5, the generation unit 230 generates configuration information indicating the content that "VLAN30" is set as the ID of the VLAN to which the image sensor 111G including the application 100G as a new function unit belongs, the ID of the VLAN of the temperature sensor 111D including the application 100D is changed from "VLAN30" to "VLAN20", and "VLAN20" is additionally set as the ID of the VLAN corresponding to the communication port 120C of the relay device 112 including the application 100F.

The generation unit 230 outputs the generated configuration information to the notification unit 250. Based on the configuration information received from the generation unit 230, the notification unit 250 notifies the image sensor 111G, the temperature sensor 111D, and the relay device 112 of the setting contents.

Figure 13:
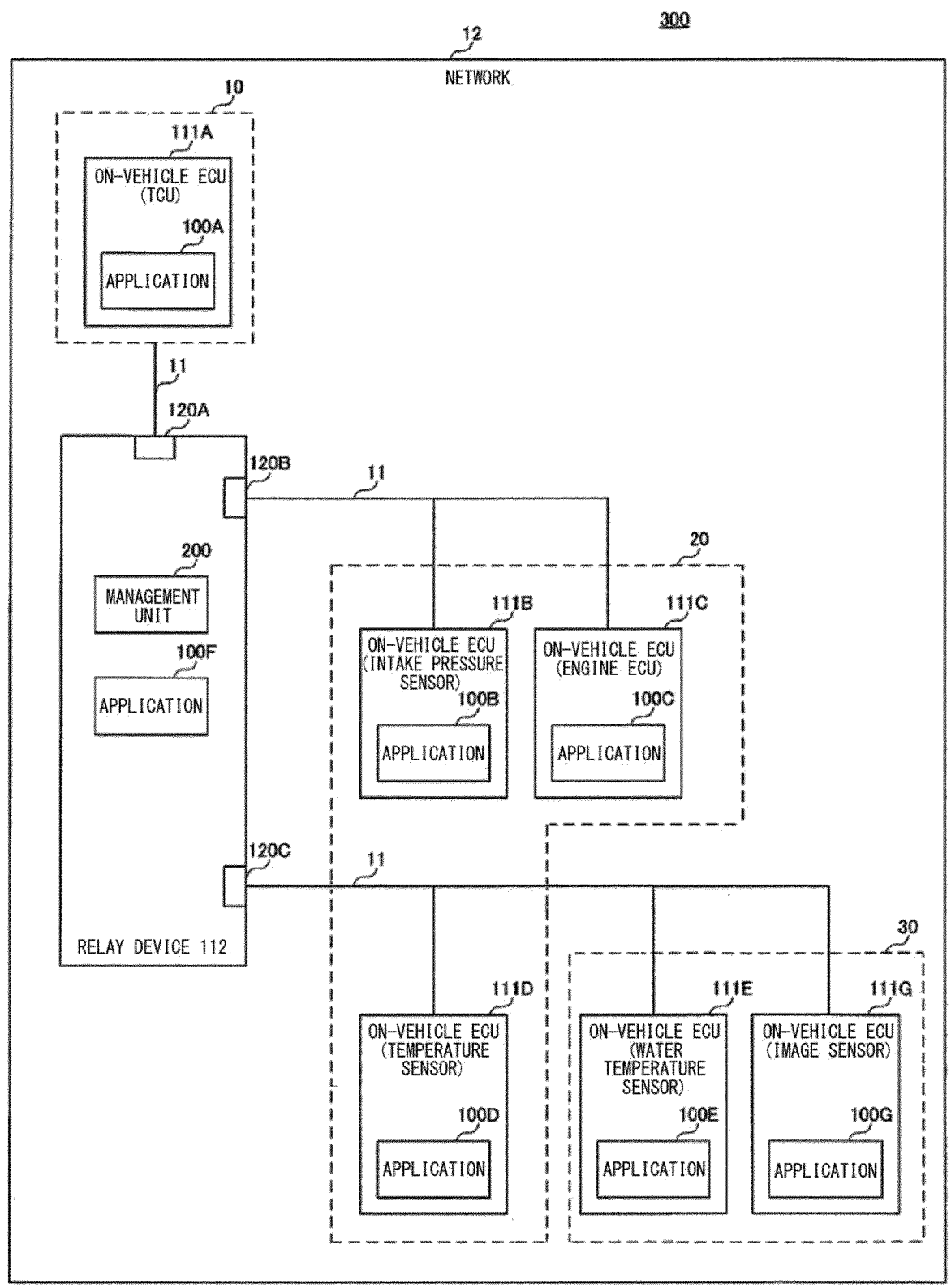
FIG. 13 shows another example of the configuration of the new network after setting change in the vehicle communication system according to the embodiment of the present disclosure.

FIG. 13 shows another example of the configuration of the new network after setting change, in the vehicle communication system according to the embodiment of the present disclosure.

With reference to FIG. 13, in the new network shown in FIG. 5, the image sensor 111G, the temperature sensor 111D, and the relay device 112 each perform setting change, based on the setting contents notified from the notification unit 250. This enables the image sensor 111G to perform communication in the VLAN 30, and enables the temperature sensor 111D to perform communication in the VLAN 20.

The generation unit 230 may acquire feasibility information indicating the feasibility of the new network and corresponding to the generated configuration information, before outputting the generated configuration information to the notification unit 250 and registering the same in the storage unit 240.

In more detail, the generation unit 230 communicates with the server 180 via the TCU 111A to acquire the feasibility information indicating the feasibility of the new network from the server 180.

Figure 14:
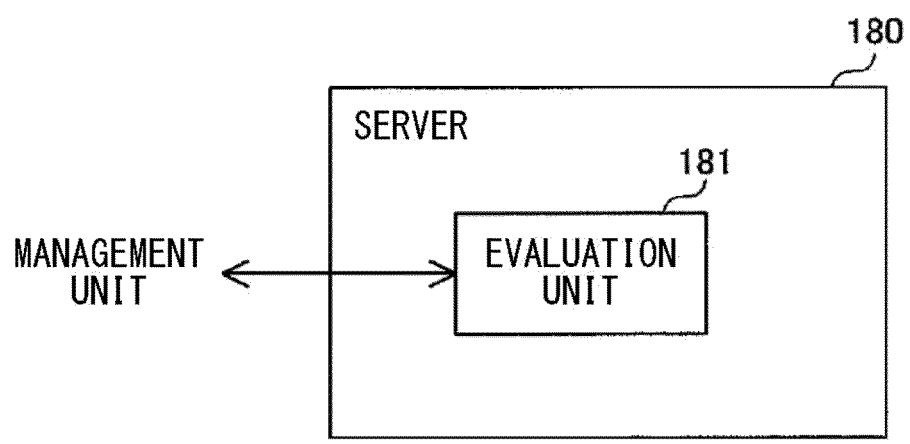
FIG. 14 shows the configuration of a server in the communication system according to the embodiment of the present disclosure.

FIG. 14 shows the configuration of the server in the communication system according to the embodiment of the present disclosure.

With reference to FIG. 14, the server 180 includes an evaluation unit 181.

The generation unit 230 in the management unit 200 transmits, to the evaluation unit 181 in the server 180, the pieces of function unit information acquired from the acquisition unit 220 and the configuration information generated based on the function unit information.

Upon receiving the function unit information and the configuration information from the generation unit 230, the evaluation unit 181 evaluates the feasibility of the new network, based on the received function unit information and configuration information. For example, the evaluation unit 181 simulates the new network to determine whether or not the new network is feasible if the respective function units in the new network are set according to the content indicated by the received configuration information.

The evaluation unit 181 generates feasibility information indicating "feasible" or "infeasible" as a result of evaluation of the feasibility of the new network.

When the feasibility information generated by the evaluation unit 181 indicates "feasible", this means that the new network as the evaluation target is feasible. When the feasibility information indicates "infeasible", this means that the new network as the evaluation target is not feasible.

The evaluation unit 181 transmits the feasibility information generated as the evaluation result to the generation unit 230 in the management unit 200.

In the management unit 200, upon acquiring the feasibility information indicating "feasible" from the evaluation unit 181, the generation unit 230 outputs the configuration information generated by itself to the notification unit 250, and registers the same in the storage unit 240.

Upon receiving the configuration information from the generation unit 230, the notification unit 250 notifies at least one of the function units in the new network, of the setting content, as described above.

Meanwhile, upon acquiring the feasibility information indicating "infeasible" from the evaluation unit 181, the generation unit 230 changes the generation condition, based on the acquired feasibility information, and newly generates configuration information according to the changed generation condition.

For example, the generation unit 230 changes the current generation condition to a generation condition that some of a plurality of new function units are not added to the network 12, and newly generates configuration information according to the changed generation condition.

Alternatively, for example, the generation unit 230 changes the generation condition by changing the functional arrangement of the function units in the current generation condition, and newly generates configuration information according to the changed generation condition.

The generation unit 230 acquires, from the server 180, feasibility information indicating the feasibility of the new network and corresponding to the newly generated configuration information.

Operation Flow

Each device in the vehicle communication system 300 includes a computer including a memory. An arithmetic processing unit such as a CPU in the computer reads out, from the memory, a program including a part or all of the steps in the following flowchart and sequence, and executes the program. Programs for the plurality of devices can be installed from outside. The programs for the plurality of devices are each distributed in a state of being stored in the storage medium.

Figure 15:
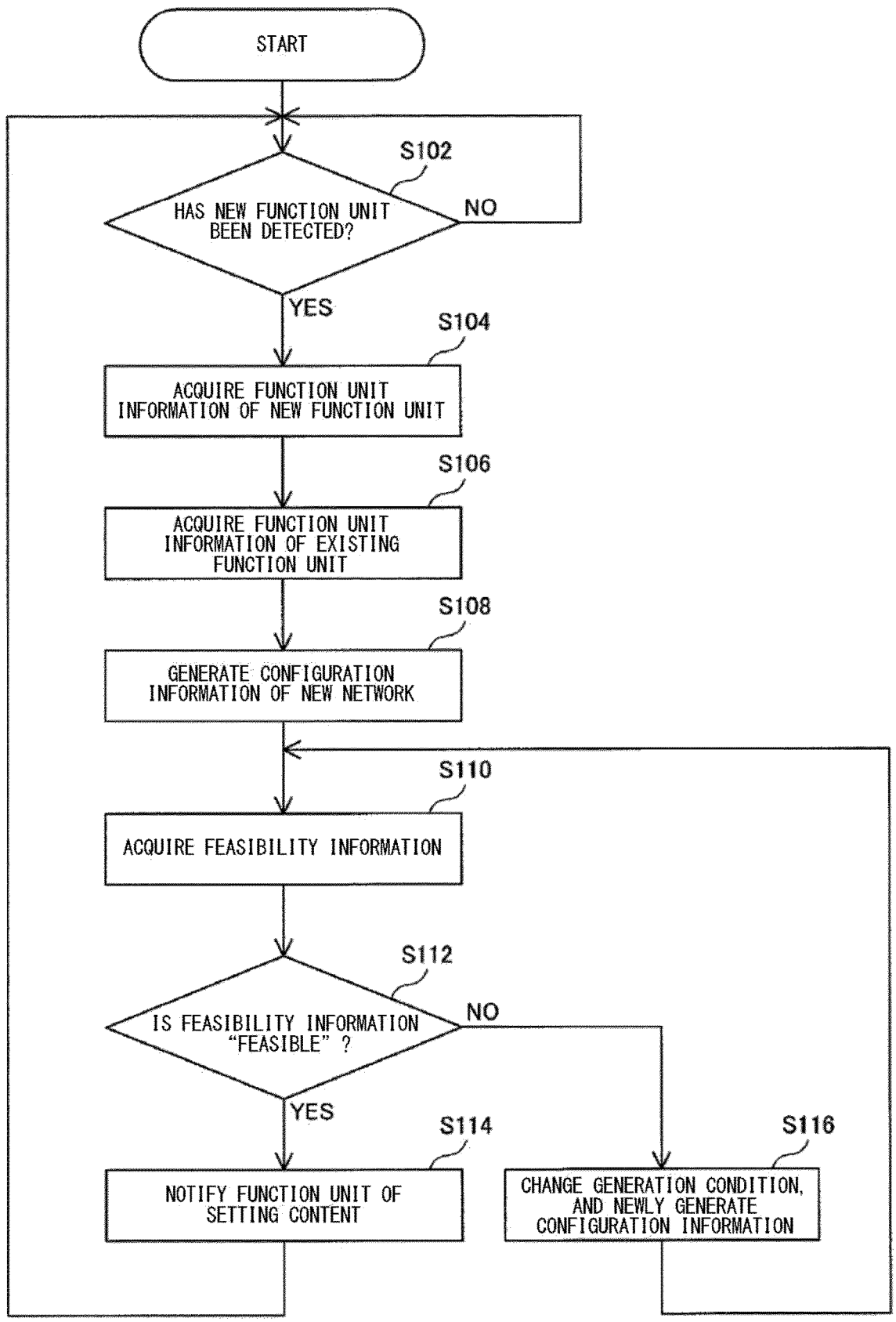
FIG. 15 is a flowchart of an operation procedure when the management unit constructs a new network in the vehicle communication system according to the embodiment of the present disclosure.

FIG. 15 is a flowchart of an operation procedure when a management unit constructs a new network in the vehicle communication system according to the embodiment of the present disclosure.

With reference to FIG. 15, firstly, the management unit 200 waits for addition of a new function unit to the network 12 (NO in step S102). The management unit 200 detects a new function unit (YES in step S102), and acquires function unit information of the detected new function unit (step S104).

Next, the management unit 200 acquires function unit information of an existing function unit (step S106).

Next, the management unit 200 generates configuration information of a new network, based on the acquired function unit information of the new function unit and the existing function unit (step S108).

Next, the management unit 200 acquires, from the server 180, feasibility information indicating the feasibility of the new network and corresponding to the generated configuration information (step S110).

When the acquired feasibility information indicates "feasible" (YES in step S112), the management unit 200 notifies one or a plurality of function units in the new network of the setting content, based on the configuration information (step S114).

Next, the management unit 200 waits for addition of a new function unit to the new network (NO in step S102).

On the other hand, when the acquired feasibility information indicates "infeasible" (NO in step S112), the management unit 200 changes the generation condition for the configuration information, and newly generates configuration information according to the changed generation condition (step S116).

Next, the management unit 200 acquires, from the server 180, feasibility information indicating the feasibility of the new network and corresponding to the newly generated configuration information (step S110).

Figure 16:
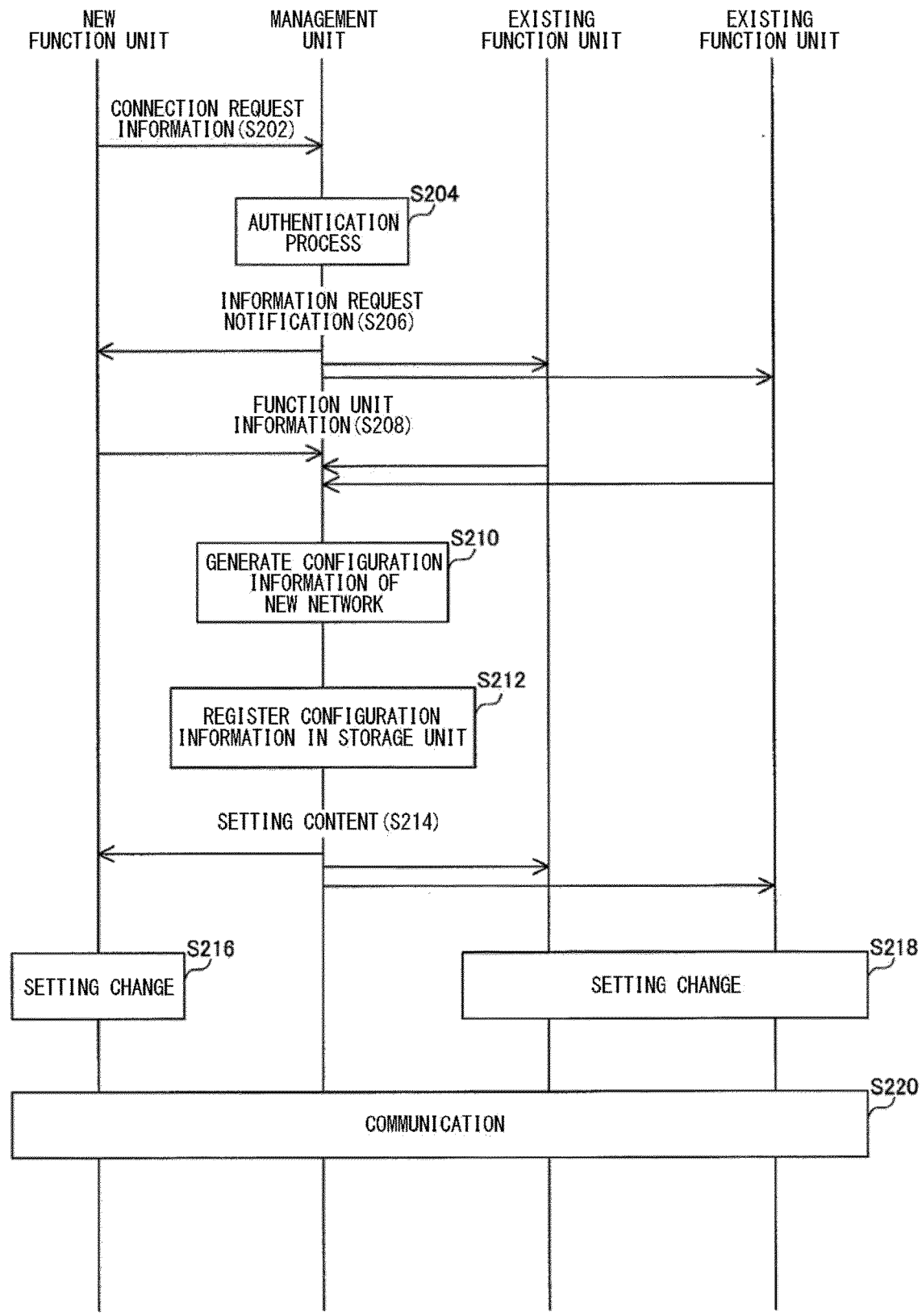
FIG. 16 shows an example of a sequence of a new network construction process in the vehicle communication system according to the embodiment of the present disclosure.

FIG. 16 shows an example of a sequence of a new network construction process in the vehicle communication system according to the embodiment of the present disclosure.

With reference to FIG. 16, firstly, a new function unit to be newly added to the network 12 transmits connection request information to the management unit 200 (step S202).

Upon receiving the connection request information from the new function unit, the management unit 200 detects this new function unit, and subjects the new function unit to an authentication process (step S204).

When the authentication of the new function unit has been successful, the management unit 200 transmits an information request notification for requesting function unit information to the new function unit and each existing function unit (step S206).

Next, the new function unit and each existing function unit each transmit, as a response to the information request notification, its own function unit information of the type designated in the information request notification, to the management unit 200 (step S208).

Next, the management unit 200 generates configuration information of a new network, based on the function unit information received from the new function unit and each existing function unit (step S210).

Next, the management unit 200 registers the generated configuration information in the storage unit 240 (step S212).

Next, based on the generated configuration information, the management unit 200 notifies the new function unit and each existing function unit of the setting contents (step S214).

Next, the new function unit changes various settings, based on the setting content notified from the management unit 200 (step S216).

Meanwhile, each existing function unit changes various settings, based on the setting content notified from the management unit 200 (step S218).

Next, the new function unit and the existing function units in the new network communicate with each other according to the changed setting content (step S220).

Figure 17:
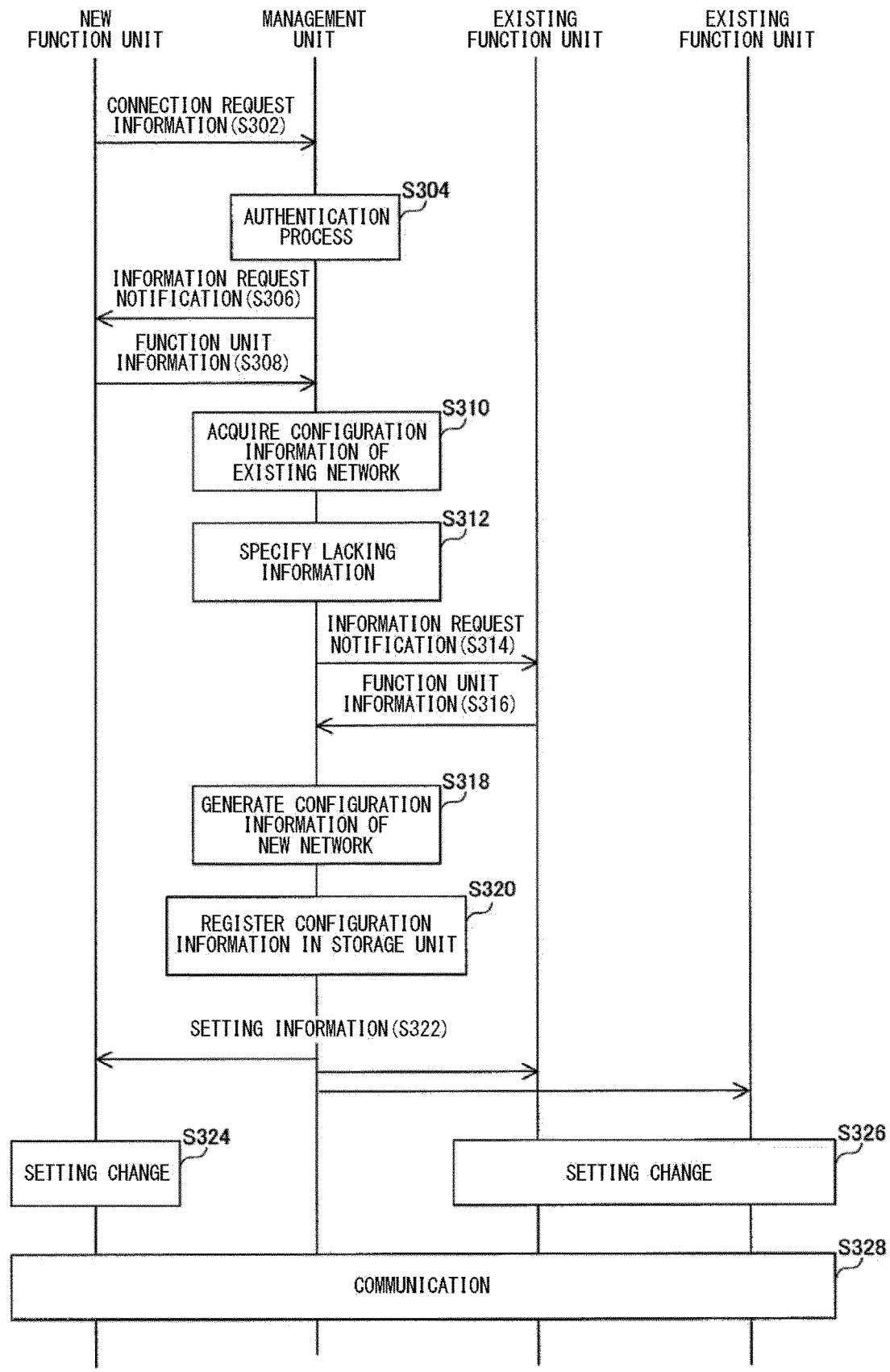
FIG. 17 shows another example of the sequence of the new network construction process in the vehicle communication system according to the embodiment of the present disclosure.

FIG. 17 shows another example of the sequence of the new network construction process in the vehicle communication system according to the embodiment of the present disclosure.

With reference to FIG. 17, firstly, a new function unit to be newly added to the network 12 transmits connection request information to the management unit 200 (step S302).

Upon receiving the connection request information from the new function unit, the management unit 200 detects this new function unit, and subjects the new function unit to an authentication process (step S304).

When the authentication of the new function unit has been successful, the management unit 200 transmits an information request notification for requesting function unit information to the new function unit (step S306).

Next, the new function unit transmits, as a response to the information request notification, its own function unit information of the type designated in the information request notification, to the management unit 200 (step S308).

Next, the management unit 200 acquires the pieces of function unit information of the respective existing function units from the configuration information of the existing network in the storage unit 240 (step S310).

Next, the management unit 200 specifies function unit information, i.e., lacking information, which could not be acquired from the configuration information of the existing network in the storage unit 240, out of the pieces of function unit information regarding the existing function units necessary for generation of the configuration information. If the pieces of function unit information of the existing function units are not included in the configuration information of the existing network in the storage unit 240, the management unit 200 regards, as lacking information, all the pieces of function unit information regarding the existing function units necessary for generation of the configuration information (step S312).

When the management unit 200 has specified, as lacking information, one or a plurality of types of function unit information regarding one or a plurality of existing function units, for example, the management unit 200 transmits an information request notification for requesting the lacking information to the one or the plurality of existing function units (step S314).

Upon receiving the information request notification, each existing function unit transmits, as a response to the information request notification, its own function unit information of the type designated in the information request notification, to the management unit 200 (step S316).

Next, the management unit 200, the new function unit, and each existing function unit perform the processes from step S318 to step S328 which are similar to the processes from step S210 to step S220 shown in FIG. 16.

Note that steps S306, S308 may not necessarily be performed prior to steps S310, S312, S314, S316, and the latter-mentioned steps may be performed before the former-mentioned steps.

Figure 18:
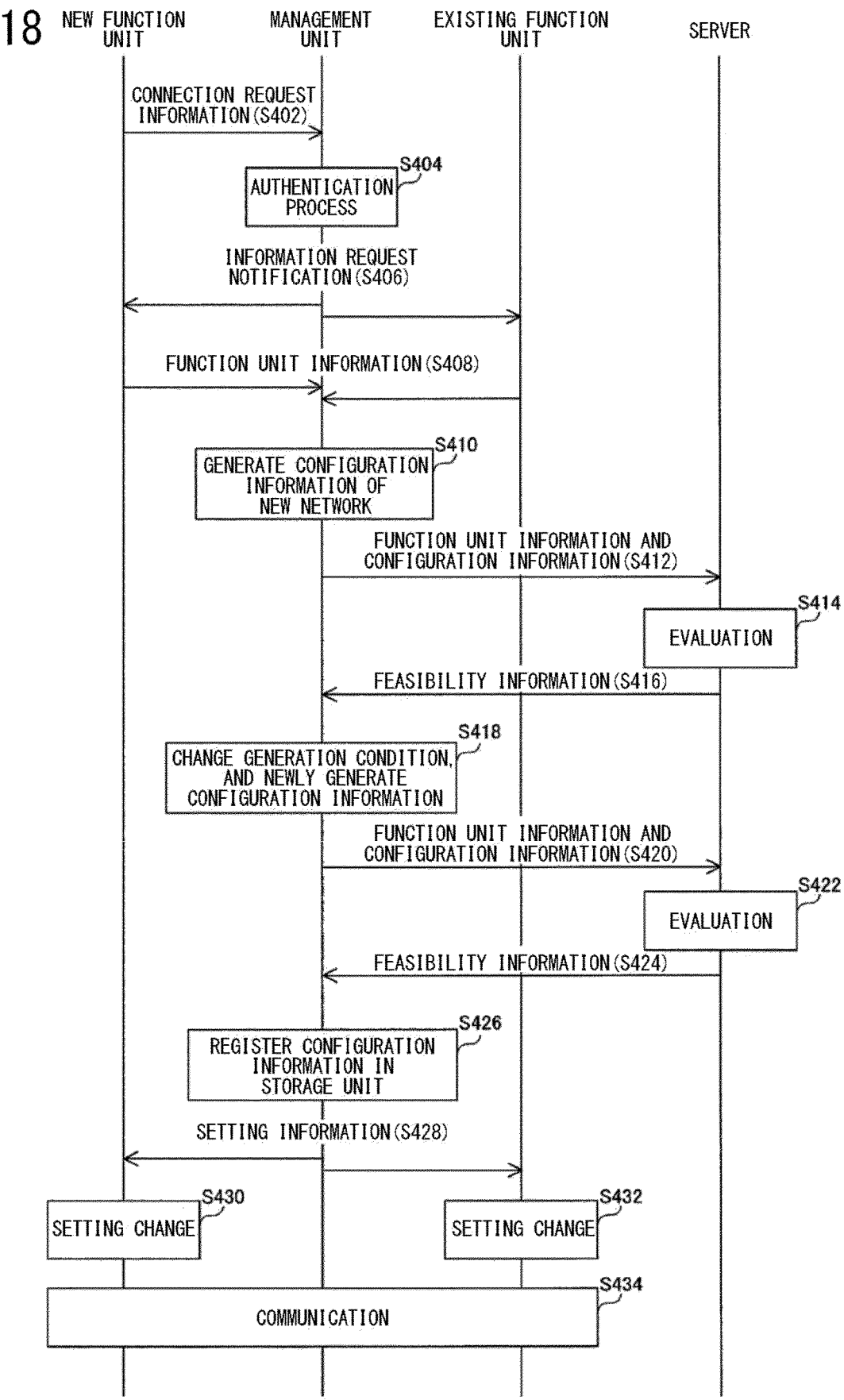
FIG. 18 shows another example of the sequence of the new network construction process in the vehicle communication system according to the embodiment of the present disclosure.

FIG. 18 shows another example of the sequence of the new network construction process in the vehicle communication system according to the embodiment of the present disclosure.

The processes from step S402 to step S410 in FIG. 18 are similar to the processes from step S202 to step S210 in FIG. 16, or similar to the processes from step S302 to step S318 in FIG. 17.

Next to step S410, the management unit 200 transmits the function unit information and the configuration information to the server 180 via a wireless base station device 161 (step S412).

Next, the server 180 evaluates the feasibility of the new network, based on the function unit information and the configuration information received from the management unit 200 (step S414).

Next, the server 180 generates feasibility information as a result of evaluation of the feasibility of the new network, and transmits the generated feasibility information to the management unit 200 via the wireless base station device 161 (step S416).

Upon receiving the feasibility information indicating "infeasible" from the server, the management unit 200 changes the generation condition for the configuration information, and newly generates configuration information according to the changed generation condition (step S418).

Next, the management unit 200 transmits the function unit information and the newly generated configuration information to the server 180 via the wireless base station device 161 (step S420).

Next, the server 180 evaluates the feasibility of the new network, based on the function unit information and the configuration information received from the management unit 200 (step S422).

Next, the server 180 generates feasibility information as a result of evaluation of the feasibility of the new network, and transmits the generated feasibility information to the management unit 200 via the wireless base station device 161 (step S424).

Upon receiving the feasibility information indicating "feasible" from the server, the management unit 200 performs the processes from step S426 to step S434 which are similar to the processes from step S212 to step S220 in FIG. 16.

In the management unit 200 according to the embodiment of the present disclosure, if an on-vehicle ECU 111 or an external device is added to the network 12, the detection unit 210 detects, as a new function unit, an application 100 included in the on-vehicle ECU 111 or the external device. However, the present disclosure is not limited thereto. The detection unit 210 may detect, as a new function unit, an on-vehicle ECU 111 or an external device, to be added to the network 12, in which no application 100 is installed.

In the management unit 200 according to the embodiment of the present disclosure, the generation unit 230 outputs the generated configuration information to the notification unit 250, and the notification unit 250 notifies the function unit that needs setting change, of the setting content, based on the configuration information received from the generation unit 230. However, the present disclosure is not limited thereto. The generation unit 230 may generate, for example, configuration information of a new network in which setting change of function units is not necessary. In this case, the management unit 200 may not necessarily include the notification unit 250.

In the management unit 200 according to the embodiment of the present disclosure, when the generation unit 230 receives, from the evaluation unit 181 in the server 180, feasibility information indicating "infeasible", the generation unit 230 changes the generation condition for the configuration information and newly generates configuration information according to the changed generation condition. However, the present disclosure is not limited thereto. The generation unit 230 may not necessarily generate new configuration information even when receiving the feasibility information indicating "infeasible". In this case, for example, the notification unit 250 notifies the new function unit that the new function unit is not added to the network 12.

In the management unit 200 according to the embodiment of the present disclosure, the generation unit 230 registers the generated configuration information in the storage unit 240. However, the present disclosure is not limited thereto. The generation unit 230 may not necessarily register the generated configuration information in the storage unit 240.

In the vehicle communication system 300 according to the embodiment of the present disclosure, the management unit 200 is included in the relay device 112 in the network 12. However, the present disclosure is not limited thereto. Some or all of the units in the management unit 200 may be included in a device other than the relay device 112 in the network 12, or may be placed outside the network 12. For example, if the management unit 200 is included in a relay device 112 in a star-type topology network as shown in FIG. 2, the management unit 200 can perform the above-described processes more efficiently.

The management unit 200 may be implemented by the server 180. In this case, a part or the entirety of the functions of the management unit 200 according to the embodiment of the present disclosure may be provided by cloud computing. That is, the management unit 200 according to the embodiment of the present disclosure may be implemented by a plurality of cloud servers or the like.

Meanwhile, a technology capable of flexibly constructing a network of a new configuration while maintaining a stable operation in the network, has been demanded.

For example, when constructing a new network by newly adding a function unit to a network, there are cases where communication required by an upper layer cannot be realized due to the network configuration of a lower layer.

As an example of the network configuration and restriction of the lower layer, there is restriction on a communication band of a physical layer. In particular, a network for which cost reduction is required, such as a network including an on-vehicle function unit such as an on-vehicle ECU, is subjected to the restriction on the communication band as described above. Therefore, it is sometimes difficult to add a new function unit to the network while maintaining the stable operation in the network.

In contrast to the above case, in the relay device 112 according to the embodiment of the present disclosure, the detection unit 210 detects addition of a function unit to the network 12 including one or a plurality of on-vehicle function units. The acquisition unit 220 acquires function unit information of a new function unit that is a function unit the addition of which has been detected by the detection unit 210, and function unit information of each on-vehicle function unit. Each piece of function unit information includes information regarding network configuration of a layer lower than an application layer. Based on the pieces of function unit information acquired by the acquisition unit 220, the generation unit 230 generates configuration information of a new network that is the network 12 further including the new function unit.

As described above, the function unit information including the information regarding the network configuration of the layer lower than each application layer is acquired, and the configuration information of the new network is generated based on the acquired function unit information, whereby the new network can be constructed while considering the network configuration of the layer lower than the application layer. Thus, it is possible to inhibit occurrence of a delay, in communication of high importance, which is caused by addition of a new function unit to the network, for example.

Therefore, in the relay device 112 according to the embodiment of the present disclosure, it is possible to flexibly construct a network of a new configuration while maintaining the stable operation in the network.

In the relay device 112 according to the embodiment of the present disclosure, the notification unit 250, based on the configuration information generated by the generation unit 230, notifies at least one of the new function unit constructing the new network and the one or the plurality of on-vehicle function units, of the setting content for performing communication in the new network.

With this configuration, the setting content of each function unit can be changed to an appropriate content according to specifications related to communication in the new network.

In the relay device 112 according to the embodiment of the present disclosure, the function unit information acquired by the acquisition unit 220 is information that allows recognition of at least one of: specifications of a plurality of hardware devices in a new network and the topology of the new network; restriction on allocation of new function units and on-vehicle function units to the hardware devices in the new network; and restriction on the communication method in the new network.

With this configuration, it is possible to construct the new network while considering various pieces of information regarding the new network.

In the relay device 112 according to the embodiment of the present disclosure, the generation unit 230 acquires feasibility information indicating the feasibility of the new network and corresponding to the generated configuration information.

With this configuration, it is possible to construct, as a new network, a network the feasibility of which has been verified while considering the logical configuration and the physical configuration.

In the relay device 112 according to the embodiment of the present disclosure, the generation unit 230 changes the generation condition, based on the acquired feasibility information, and newly generates configuration information according to the changed generation condition.

With this configuration, if it is difficult to construct a network based on the generated configuration information, it is possible to newly generate configuration information of a new network in which the additional content of the new function unit to the network is changed, for example. This enables more flexible construction of the new network.

In the relay device 112 according to the embodiment of the present disclosure, the storage unit 240 stores therein the configuration information generated by the generation unit 230.

With this configuration, when a new network is constructed by adding a new function unit to the existing network, a part or the entirety of the function unit information of the existing function units can be acquired from the configuration information, of the existing network, stored in the storage unit, thereby simplifying the network construction process.

The vehicle 1 according to the embodiment of the present disclosure includes the relay device 112.

With this configuration, in the vehicle 1 including the relay device 112, a network of a new configuration can be flexibly constructed while maintaining the stable operation in the network.

The vehicle communication system 300 according to the embodiment of the present disclosure includes the relay device 112, and one or a plurality of on-vehicle function units constituting the network 12. The relay device 112 detects addition of a function unit to the network 12, and acquires, from a new function unit that is the function unit the addition of which has been detected, function unit information including information regarding network configuration of a layer lower than the application layer. The one or the plurality of on-vehicle function units each transmit, to the relay device 112, its own function unit information including the information regarding the network configuration of the layer lower than the application layer. Based on the function unit information acquired from the new function unit and the function unit information received from the one or the plurality of on-vehicle function units, the relay device 112 generates configuration information of a new network that is the network 12 further including the new function unit.

As described above, the function unit information of the new function unit and the function unit information of each on-vehicle function unit, each including the information regarding the network configuration of the layer lower than the application layer, are acquired, and the configuration information of the new network is generated based on the pieces of function unit information acquired, whereby the new network can be constructed while considering the network configuration of the layer lower than the application layer. Thus, it is possible to inhibit occurrence of a delay, in communication of high importance, which is caused by addition of a new function unit to the network, for example.

Therefore, in the vehicle communication system 300 according to the embodiment of the present disclosure, it is possible to flexibly construct a network of a new configuration while maintaining the stable operation in the network.

The vehicle communication management method according to the embodiment of the present disclosure is a vehicle communication management method in the relay device 112. In the vehicle communication management method, firstly, the relay device 112 detects addition of a function unit to the network 12 including one or a plurality of on-vehicle function units. Next, the relay device 112 acquires function unit information of a new function unit that is the function unit the addition of which has been detected and function unit information of each on-vehicle function unit included in the network 12, each including information regarding network configuration of a layer lower than an application layer. Next, based on the pieces of function unit information acquired, the relay device 112 generates configuration information of a new network that is the network 12 further including the new function unit.

In the above method, the function unit information of the new function unit and the function unit information of the on-vehicle function unit, each including the information regarding the network configuration of the layer lower than the application layer, are acquired, and the configuration information of the new network is generated based on the pieces of function unit information acquired, whereby the new network can be constructed while considering the network configuration of the layer lower than the application layer. Thus, it is possible to inhibit occurrence of a delay, in communication of high importance, which is caused by addition of a new function unit to the network, for example.

Therefore, in the vehicle communication management method according to the embodiment of the present disclosure, it is possible to flexibly construct a network of a new configuration while maintaining the stable operation in the network.

The vehicle communication management method according to the embodiment of the present disclosure is a vehicle communication management method in the vehicle communication system including the relay device 112 and the one or the plurality of on-vehicle function units constituting the network 12. In the vehicle communication management method, firstly, the relay device 112 detects addition of a function unit to the network 12, and acquires, from a new function unit that is the function unit the addition of which has been detected, function unit information including information regarding network configuration of a layer lower than the application layer. Next, the one or the plurality of on-vehicle function units each transmit, to the relay device 112, its own function unit information including information regarding network configuration of a layer lower than the application layer. Next, based on the function unit information acquired from the new function unit and the function unit information received from the one or the plurality of on-vehicle function units, the relay device 112 generates configuration information of a new network that is the network 12 further including the new function unit.

In the above method, the function unit information of the new function unit and the function unit information of the on-vehicle function unit, each including the information regarding the network configuration of the layer lower than the application layer, are acquired, and the configuration information of the new network is generated based on the pieces of function unit information acquired, whereby the new network can be constructed while considering the network configuration of the layer lower than the application layer. Thus, it is possible to inhibit occurrence of a delay, in communication of high importance, which is caused by addition of a new function unit to the network, for example.

Therefore, in the vehicle communication management method according to the embodiment of the present disclosure, it is possible to flexibly construct a network of a new configuration while maintaining the stable operation in the network.

The above-described embodiment is illustrative in all aspects and should be considered not restrictive. The scope of the present invention is not limited by the configuration of the above-described embodiment but is defined by the claims, and is intended to include meaning equivalent to the scope of the claims and all modifications within the scope.

The above description includes the features in the additional notes below.

Additional Note 1

A management device comprising:
a detection unit configured to detect a new function unit that is a function unit to be newly added to a network including one or a plurality of on-vehicle function units;
an acquisition unit configured to acquire function unit information of the new function unit detected by the detection unit and function unit information of each on-vehicle function unit, each piece of function unit information including information regarding network configuration of a layer lower than an application layer;
a generation unit configured to, based on the pieces of function unit information acquired by the acquisition unit, generate configuration information with logical configuration and physical configuration being considered, in a new network that is the network further including the new function unit; and
a notification unit configured to, based on the configuration information generated by the generation unit, notify at least one of the new function unit and the on-vehicle function units in the new network, of a setting content for performing communication in the new network.

Additional Note 2

A vehicle communication system comprising:
a management device;
one or a plurality of on-vehicle function units constructing a network; and
a new function unit that is a function unit to be newly added to the network, wherein
the management device detects addition of the new function unit to the network,
the new function unit and the one or the plurality of on-vehicle function units each transmit, to the management device, its own function unit information including information regarding network configuration of a layer lower than an application layer,
the management device, based on the pieces of function unit information received from the new function unit and the one or the plurality of on-vehicle function units, generates configuration information with logical configuration and physical configuration being considered, in a new network that is the network further including the new function unit, and
the management device, based on the generated configuration information, notifies at least one of the new function unit and the on-vehicle function units in the new network, of a setting content for performing communication in the new network.

Additional Note 3

A management device including a processor,
the processor implementing:
a detection unit configured to detect a new ECU that is a function unit to be newly added to a network including one or a plurality of on-vehicle ECUs;
an acquisition unit configured to acquire function unit information of the new ECU detected by the detection unit and function unit information of each on-vehicle ECU, each piece of function unit information including information regarding network configuration of a layer lower than an application layer; and
a generation unit configured to, based on the pieces of function unit information acquired by the acquisition unit, generate configuration information of a new network that is the network further including the new ECU.

Additional Note 4

A vehicle communication system comprising:
a management device;
one or a plurality of on-vehicle ECUs constructing a network; and
a new ECU that is a function unit to be newly added to the network, wherein
the management device detects addition of the new ECU to the network,
the new ECU and the one or the plurality of on-vehicle ECUs each transmit, to the management device, its own function unit information including information regarding network configuration of a layer lower than an application layer, and
the management device, based on the pieces of function unit information received from the new ECU and the one or the plurality of on-vehicle ECUs, generates configuration information of a new network that is the network further including the new ECU.

REFERENCE SIGNS LIST 1 vehicle
10 VLAN
11 Ethernet cable
12 network
20 VLAN
30 VLAN
100 application
111 on-vehicle ECU
112 relay device
113 external device
161 wireless base station device
170 external network
180 server
181 evaluation unit
182 storage device
200 management unit
210 detection unit
220 acquisition unit
230 generation unit 240 storage unit
250 notification unit
300 vehicle communication system
400 communication system

The invention claimed is:

1. A vehicle communication system comprising:
a management device;
a storage device; and
one or a plurality of on-vehicle function units constructing a network, wherein
the management device detects addition of a function unit to the network, and acquires, from a new function unit that is the function unit the addition of which has been detected, function unit information including information regarding network configuration of a layer lower than an application layer,
the one or the plurality of on-vehicle function units each transmit, to the management device, its own function unit information including information regarding network configuration of a layer lower than an application layer,
the management device generates configuration information of a new network that is the network further including the new function unit, based on the function unit information acquired from the new function unit and on the function unit information received from the one or the plurality of on-vehicle function units, and
when feasibility of the new network is denied based on the function unit information and the configuration information, the management device newly generates configuration information based on a generation condition changed based on feasibility information indicating that the new network is infeasible, wherein
the function unit information includes information of a communication port that the on-vehicle function unit uses for communication, and a VLAN ID of a VLAN to which the on-vehicle function unit belongs,
the new function unit does not have a VLAN ID at the time the addition of the new function unit to the network is detected, and
the management device assigns, based on the communication port that the on-vehicle function unit uses for communication and the VLAN ID of the VLAN to which the on-vehicle function unit belongs, the VLAN ID corresponding to the communication port used by the new function unit in the new network to the new function unit that does not have a VLAN ID yet.

2. The vehicle communication system according to claim 1, wherein the configuration information includes both (i) information of a communication port that the function unit uses for communication, and (ii) a VLAN ID of a VLAN to which the function unit belongs.

3. The vehicle communication system according to claim 1, wherein the management device acquires the function unit information from at least one of the storage device and the on-vehicle function unit.

4. A management device comprising a hardware processor configured to cause the management device to perform operations, and a storage device, the operations comprising:
detecting addition of a function unit to a network including one or a plurality of on-vehicle function units;
acquiring function unit information of a new function unit that is the function unit the addition of which has been detected and function unit information of each on-vehicle function unit, each piece of function unit information including information regarding network configuration of a layer lower than an application layer;
generating, based on the pieces of function unit information acquired, configuration information of a new network that is the network further including the new function unit; and
when feasibility of the new network is denied based on the function unit information and the configuration information, newly generating configuration information based on a generation condition changed based on feasibility information indicating that the new network is infeasible, wherein
the function unit information includes information of a communication port that the on-vehicle function unit uses for communication, and a VLAN ID of a VLAN to which the on-vehicle function unit belongs,
the new function unit does not have a VLAN ID at the time the addition of the new function unit to the network is detected, and
the generating includes assigning, based on the communication port that the on-vehicle function unit uses for communication and the VLAN ID of the VLAN to which the on-vehicle function unit belongs, the VLAN ID corresponding to the communication port used by the new function unit in the new network to the new function unit that does not have a VLAN ID yet.

5. The management device according to claim 4, wherein the operations further comprise notifying, based on the generated configuration information, at least one of the new function unit and the one or the plurality of on-vehicle function units which constitute the new network, of a setting content for performing communication in the new network.

6. The management device according to claim 4, wherein the function unit information is information that allows recognition of at least one of: specifications of a plurality of hardware devices in the new network and a topology of the new network; restriction on allocation of the new function unit and the on-vehicle function units to the hardware devices in the new network; and restriction on a communication method in the new network.

7. The management device according to claim 4, wherein the generating includes acquiring feasibility information indicating feasibility of the new network and corresponding to the generated configuration information.

8. The management device according to claim 7, wherein the generating includes changing generation condition, based on the acquired feasibility information, and newly generating the configuration information according to the changed generation condition.

9. The management device according to claim 4, wherein the operations further comprise storing the generated configuration information.

10. The management device according to claim 7, wherein
the generating includes acquiring the feasibility information from another device.

11. The management device according to claim 4, wherein the generating includes generating the configuration information, on the basis of the pieces of function unit information acquired, while taking logical configuration and physical configuration of the new network into consideration.

12. The management device according to claim 4, wherein the configuration information includes both (i) information of a communication port that the function unit uses for communication, and (ii) a VLAN ID of a VLAN to which the function unit belongs.

13. The management device according to claim 4, wherein the acquiring includes acquiring the function unit information from at least one of the storage device and the on-vehicle function unit.

14. A vehicle communication management method performed by a management device, comprising:
- detecting addition of a function unit to a network including one or a plurality of on-vehicle function units;
- acquiring function unit information of a new function unit that is the function unit the addition of which has been detected and function unit information of each on-vehicle function unit, each piece of function unit information including information regarding network configuration of a layer lower than an application layer;
- generating, based on the pieces of function unit information acquired, configuration information of a new network that is the network further including the new function unit; and
- when feasibility of the new network is denied based on the function unit information and the configuration information, newly generating configuration information based on a generation condition changed based on feasibility information indicating that the new network is infeasible, wherein
- the function unit information includes information of a communication port that the on-vehicle function unit uses for communication, and a VLAN ID of a VLAN to which the on-vehicle function unit belongs,
- the new function unit does not have a VLAN ID at the time the addition of the new function unit to the network is detected, and
- the generating includes assigning, based on the communication port that the on-vehicle function unit uses for communication and the VLAN ID of the VLAN to which the on-vehicle function unit belongs, the VLAN ID corresponding to the communication port used by the new function unit in the new network to the new function unit that does not have a VLAN ID yet.

15. The vehicle communication management method according to claim 14, wherein the configuration information includes both (i) information of a communication port that the function unit uses for communication, and (ii) a VLAN ID of a VLAN to which the function unit belongs.

16. The vehicle communication management method according to claim 14, wherein the acquiring includes acquiring the function unit information from at least one of a storage device and the on-vehicle function unit.

17. A non-transitory computer-readable storage medium having, stored therein, a vehicle communication management program used in a management device, the program causing a computer to perform operations comprising:
- detecting addition of a function unit to a network including one or a plurality of on-vehicle function units;
- acquiring function unit information of a new function unit that is the function unit the addition of which has been detected and function unit information of each on-vehicle function unit, each piece of function unit information including information regarding network configuration of a layer lower than an application layer;
- generating, based on the pieces of function unit information acquired, configuration information of a new network that is the network further including the new function unit; and
- when feasibility of the new network is denied based on the function unit information and the configuration information, newly generating configuration information based on a generation condition changed based on feasibility information indicating that the new network is infeasible, wherein
- the function unit information includes information of a communication port that the on-vehicle function unit uses for communication, and a VLAN ID of a VLAN to which the on-vehicle function unit belongs,
- the new function unit does not have a VLAN ID at the time the addition of the new function unit to the network is detected, and
- the generating includes assigning, based on the communication port that the on-vehicle function unit uses for communication and the VLAN ID of the VLAN to which the on-vehicle function unit belongs, the VLAN ID corresponding to the communication port used by the new function unit in the new network to the new function unit that does not have a VLAN ID yet.

18. The non-transitory computer-readable storage medium according to claim 17, wherein the configuration information includes both (i) information of a communication port that the function unit uses for communication, and (ii) a VLAN ID of a VLAN to which the function unit belongs.

19. The non-transitory computer-readable storage medium according to claim 17, wherein the computer includes a storage device, and the acquiring includes acquiring the function unit information from at least one of the storage device and the on-vehicle function unit.

* * * * *